(12) United States Patent
Muddu et al.

(10) Patent No.: US 9,009,664 B2
(45) Date of Patent: Apr. 14, 2015

(54) STRUCTURAL SEARCH OF SOURCE CODE

(75) Inventors: Basava Raju Muddu, Bangalore (IN); Allahbaksh Mohammedali Asadullah, Hubli (IN); Jeena Vinod, Bangalore (IN); Krishna Kumar Pooloth, Bangalore (IN)

(73) Assignee: Infosys Limited, Bangalore (IN)

(*) Notice: Subject to any disclaimer, the term of this patent is extended or adjusted under 35 U.S.C. 154(b) by 0 days.

(21) Appl. No.: 13/111,870

(22) Filed: May 19, 2011

(65) Prior Publication Data

US 2012/0254835 A1    Oct. 4, 2012

(30) Foreign Application Priority Data

Mar. 31, 2011    (IN) .......................... 1061/CHE/2011

(51) Int. Cl.
*G06F 9/44*    (2006.01)
(52) U.S. Cl.
CPC ...................................... *G06F 8/75* (2013.01)
(58) Field of Classification Search
CPC ....... G06F 8/71; G06F 8/31; G06F 17/30864; G06F 17/3087; G06F 17/30893
USPC ........................................................ 717/121
See application file for complete search history.

(56) References Cited

U.S. PATENT DOCUMENTS

| | | |
|---|---|---|
| 5,640,558 A | 6/1997 | Li |
| 5,802,334 A | 9/1998 | Nickolas et al. |
| 5,832,500 A | 11/1998 | Burrows |
| 6,295,542 B1 | 9/2001 | Corbin |
| 6,314,559 B1 | 11/2001 | Sollich |
| 6,381,556 B1 | 4/2002 | Kazemi et al. |
| 6,643,641 B1* | 11/2003 | Snyder .......................... 707/709 |
| 6,728,752 B1 | 4/2004 | Chen et al. |
| 6,839,702 B1 | 1/2005 | Patel et al. |
| 6,976,243 B2 | 12/2005 | Charisius et al. |
| 6,993,710 B1 | 1/2006 | Coad et al. |
| 7,137,112 B2 | 11/2006 | Lovvik et al. |
| 7,454,744 B2 | 11/2008 | Bhogal et al. |
| 7,505,964 B2 | 3/2009 | Tong et al. |
| 7,536,408 B2 | 5/2009 | Patterson |
| 7,577,939 B2* | 8/2009 | Bayardo et al. ............... 717/120 |

(Continued)

OTHER PUBLICATIONS

CodeRun, "CodeRun Studio: A free, cross-platform browser-based IDE," <http://www.coderun.com/studio/>, 3 pages (accessed Mar. 10, 2011).

(Continued)

*Primary Examiner* — Ryan Coyer
*Assistant Examiner* — Hui-Wen Lin
(74) *Attorney, Agent, or Firm* — Klarquist Sparkman, LLP

(57) ABSTRACT

Techniques and tools are described for searching source code. For example, source code can be indexed, a code structure query can be received, index records that conform to the code structure query can be identified, and code structure query results that correspond to the identified index records conforming to the code structure query can be sent. Also for example, a code structure query can be sent, a list of code structure query results corresponding to index records that conform to the code structure query can be received, at least one of the code structure query results can be selected, based on the selection, a formatted source-code file and a code hierarchy can be received, a code annotation associated with the formatted source-code file can be sent, and an annotation result corresponding to the formatted source-code file can be received.

21 Claims, 13 Drawing Sheets

(56) References Cited

U.S. PATENT DOCUMENTS

| | | | |
|---|---|---|---|
| 7,584,453 | B2 | 9/2009 | Bayardo, Jr. et al. |
| 7,594,222 | B2 | 9/2009 | Horwitz et al. |
| 8,146,058 | B2 | 3/2012 | Sarkar et al. |
| 8,209,665 | B2 | 6/2012 | Rama et al. |
| 8,392,443 | B1 | 3/2013 | Allon et al. |
| 8,566,787 | B2 | 10/2013 | Rama et al. |
| 8,566,789 | B2 | 10/2013 | Siddaramappa et al. |
| 2004/0194141 | A1* | 9/2004 | Sanders ............................ 725/53 |
| 2005/0097508 | A1 | 5/2005 | Jacovi et al. |
| 2005/0278695 | A1 | 12/2005 | Synovic |
| 2007/0050343 | A1* | 3/2007 | Siddaramappa et al. ......... 707/3 |
| 2007/0061294 | A1 | 3/2007 | Parnell et al. |
| 2007/0118542 | A1 | 5/2007 | Sweeney |
| 2007/0250810 | A1 | 10/2007 | Tittizer et al. |
| 2007/0299825 | A1 | 12/2007 | Rush et al. |
| 2008/0086451 | A1 | 4/2008 | Torres et al. |
| 2008/0127034 | A1 | 5/2008 | Pasricha et al. |
| 2008/0155508 | A1 | 6/2008 | Sarkar et al. |
| 2008/0243778 | A1 | 10/2008 | Behnen et al. |
| 2008/0301639 | A1 | 12/2008 | Bell et al. |
| 2009/0058847 | A1 | 3/2009 | Lewis |
| 2009/0077091 | A1 | 3/2009 | Khen et al. |
| 2009/0119576 | A1* | 5/2009 | Pepper et al. .................. 715/230 |
| 2009/0178031 | A1* | 7/2009 | Zhao ............................. 717/143 |
| 2009/0198689 | A1* | 8/2009 | Frazier et al. .................... 707/6 |
| 2010/0070949 | A1 | 3/2010 | Rama et al. |
| 2010/0131517 | A1 | 5/2010 | Huang et al. |
| 2010/0306192 | A1 | 12/2010 | Kapur et al. |
| 2012/0246610 | A1 | 9/2012 | Asadullah et al. |
| 2012/0254162 | A1 | 10/2012 | Asadullah et al. |

OTHER PUBLICATIONS

Nikitin, Microsoft, "Development Environment as a Service," P.com No. IPCOM000145426D, Original Publication Date: Jan. 16, 2007, copyright 2006 Microsoft, 8 pages.
Storey et al., University of Victoria BC, Canada and IBM Canada, "Improving the Usability of Eclipse for Novice Programmers," Proceeding eclipse '03 Proceedings of the 2003 OOPSLA workshop on eclipse technology eXchange, pp. 35-39, ACM New York, NY USA copyright 2003, 5 pages.
Brito E Abreu et al., "A coupling-guided cluster Analysis approach to reengineer the modularity of object-oriented systems," IEEE conference on software maintenance and reengineering, 2000, 10 pages.
Emanuel et al., "Modularity Index Metrics for Java-Based Open Source Software Projects, "International Journal of Advanced Computer Science and Applications, vol. 2, No. 11, 2011, 7 pages.
"360 Search Results Clustering | Serials Solutions" http://www.serialsolutions.com/360-search-results-clustering, visited Mar. 7, 2011, 3 pages.
"iBoogie—MetaSearch Document Clustering Engine and Personalized Search Engines Directory" http://www.iboogie.com/text/about.asp, visited Search Mar. 7, 2011, 3 pages
"Information Visualization for Search Interfaces (Ch 10) | Search User Interfaces" from the book "Search User Interfaces," Published by Cambridge University Press, Copyright 2009, http://searchuserinterfaces.com/book/sui_ch10_visualization.html, visited Mar. 7, 2011, 58 pages.
"MOSS Faceted search" msdn archive, Nov. 1, 2010, 2 pages.
"Drupal: Faceted Search," drupal.org/project/faceted_search, May 19, 2007, 3 pages.
Code Monkey, "Faceted search," raverly.com, Sep. 2010, 2 pages.
Krugler et al., "Search-driven development: Five reasons why search is your most powerful tool," LinuxWorld.com, Jan. 29, 2007, http://www.networkworld.com/news/2007/012907-search.html, 4 pages.
"The 4 Hidden Costs of Code Maintenance," White Paper at Krugle.com, Sep. 2008, 9 pages.
Carrot2, http://project.carrot2.org/index.html, archived on Mar. 10, 2011, 2 pages.
Codase, http://www.codase.com, Copyright 2009, archived on Mar. 9, 2011, 1 page.
Google code search, http://www.google.com/codesearch, visited Mar. 8, 2011, 3 pages.
Jexample. http://www.jexamples.com, archived on Mar. 5, 2011, 1 page.
Koders. http://www.koders.com, archived Mar. 9, 2011, 1 page.
Krugle. http://www.krugle.com, archived Mar. 8, 2011, 1 page.
Atkinson et al. "Effective Pattern Matching of Source Code Using Abstract Syntax Patterns," *Software Practice Exper.*, 36:413-447, 2006, 35 pages.
Begel, "Codifier: A Programmer Centric Search User Interface," *Workshop on Human-Computer Interaction and Information Retrieval*, 2007, 2 pages.
Chatterjee et al., "SNIFF: A Search Engine for Java Using Free Form Queries," Proceedings of 12th International Conference on Fundamental approach to Software engineering, 2009, 16 pages.
Devanbu, "Genoa: A Customizable Language and Front End Independent Code Analyzer," *Proceedings of ICSE* (Melbourne, Australia), 1992, 11 pages.
Devanbu et al., "Lassie: A Knowledge-Based Software Information System," *12th International Conference on software Engineering*, 1990, 15 pages.
Mandelin et al., "Jungloid Mining: Helping to Navigate the API Jungle," *Programmable Language Design and Implementation*, 2005, 14 pages.
Stylos et al., "A Web Search Tool for Finding API Components and Examples," IEEE Symposium on VL and HCC, 2006, 8 pages.
Keivanloo et al., "SE-CodeSearch: A Scalable Semantic Web-Based Source Code Search Infrastructure," aseg.cs.concordia.ca, 2010, 5 pages.
Erlikh, Leveraging Legacy System Dollars for E-Business, *IT Pro*, pp. 17-23, May/Jun. 2000.
Grechanik et al., "A Search Engine for Finding Highly Relevant Applications," *Proceedings of 32nd ACM/IEEE International Conference on Software Engineering 2010*, 2010, 10 pages.
Inoue et al. "Ranking Significance of Software Components Based on Use Relations," *IEEE Transactions on Software Engineering*, vol. 31, No. 3, pp. 213-225, Mar. 2005.
Hummel et al., "Code Conjurer: Pulling Resuable Software Out of Thin Air," *IEEE Software*, pp. 45-52, Sep./Oct. 2008.
Maskeri et al. "Mining Business Topics in Source Code Using Latent Dirichlet Allocation," *1st India Software Engineering Conference*, Hyderabad, India, Feb. 19-22, 2008, 9 pages.
Reiss, "Semanticcs-Based Code Search," *International Conference on Software Engineering*, 2009, 11 pages.
Hoffman et al. "Assieme: Finding and Leveraging Implicit References in a Web Search Interface for Programmers," *Proceedings of the 20th annual ACM symposium on User interface software and technology*, Oct. 7-10, 2007, Newport, Rhode Island, 2007, 10 pages.
Holmes et al., "Using Strucutral Context to Recommend Source Code Examples," *Proceedings of the 5th International conference on Software Engineering*, May 15-21, 2005, St. Louis, Missouri, 9 pages.
Thumalapenta et al. "PARSEWeb: Programmer Assistant for Reusing Open Source Code on the Web," International conference on Automated Software Engineering, Nov. 4-9, 2007, Atlanta, Georgia 2007, 10 pages.
Sahavechaphan et al., "XSnippet: Mining for Sample Code," *OOPSLA 2006*, 2006, 19 pages.
Bajracharya et al., "Sourcerer: A Search Engine for Open Source Code Supporting Structure Based Search," *Proceedings of 21st conference on Object oriented programming, Systems, Languages and Applications*, Oct. 22-26, 2006, Portland, Oregon, 2 pages.
Henninger, "Supporting the Construction and Evolution of Component Repositories," *International Conference on Software Engineering*, pp. 279-288, 1996.
Sillito et al., "Questions Programmers Ask During Software Evolution Tasks," *Proceedings of the 14th ACM SIGSOFT International Symposium on Foundations of Software Engineering*, Nov. 5-11, 2006, Portland, Oregon, 2006, 11 pages.
Paul et al., "A Framework for Source Code Search Using Program Patterns," *IEEE Trans. Software Engineering*, vol. 20, No. 6, pp. 463-475, Jun. 1994.
Ye et al., "Supporting Reuse by Delivering Task Relevant and Personalized Information," *International Conference on Software Engineering*, Buenos-Aires, Argentina, May 19-25, 2002, 11 pages.

\* cited by examiner

STRUCTURAL SEARCH OF SOURCE CODE

CROSS REFERENCE TO RELATED APPLICATIONS

This application claims priority from Application No. 1061/CHE/2011, filed in India on Mar. 31, 2011, which is hereby incorporated by reference herein.

BACKGROUND

Large software systems can be difficult to maintain. Source code repositories can have millions of lines of code written in various programming languages over many years by multiple source code developers. Today, there exists search tools and technologies that enable maintainers to search software. During software maintenance, a significant amount of time is spent on searching code and understanding it. Thus, searching large repositories of software source code can be difficult and time consuming.

SUMMARY

In Summary, the Detailed Description presents a variety of tools and techniques related to searching source code.

According to one implementation of the technologies described herein, source code can be indexed to create index records, for code elements, comprising structure fields and values. In the indexing, source code can be parsed according to syntax of a programming language. A code structure query comprising a field-value expression including field and value terms can be received. Index records conforming to the code structure query can be identified. Code structure query results corresponding to the identified conforming index records can be sent.

In another implementation, a code structure query comprising a field-value expression can be sent. A list of code structure query results corresponding to index records that conform to the code structure query can be received. At least one of the code structure query results can be selected. Based on the selection, formatted source-code can be received. A code annotation comprising comments associated with the formatted source-code file can be sent. An annotation result corresponding to the formatted source-code file can be received.

This Summary is not intended to be used to limit the scope of the claimed subject matter. The foregoing and other objects, features, and advantages of the technologies will become more apparent from the following Detailed Description, which proceeds with reference to the accompanying figures.

DETAILED DESCRIPTION

EXAMPLE 1

Exemplary Overview

There are a variety of circumstances under which it may be desirable to search for source code. For example, a user may want to reuse source code written for a previous project to quickly advance a new project's development, or for finding other versions of software that might have a similar bug during debugging. Because source code can be segmented by the structures of the code, a user may desire to search for structures or code elements such as classes or methods with specified attributes. The source code search techniques described herein can be used to search source code based on the structure of the source code.

EXAMPLE 2

Exemplary System Employing a Combination of the Technologies

Figure 1:
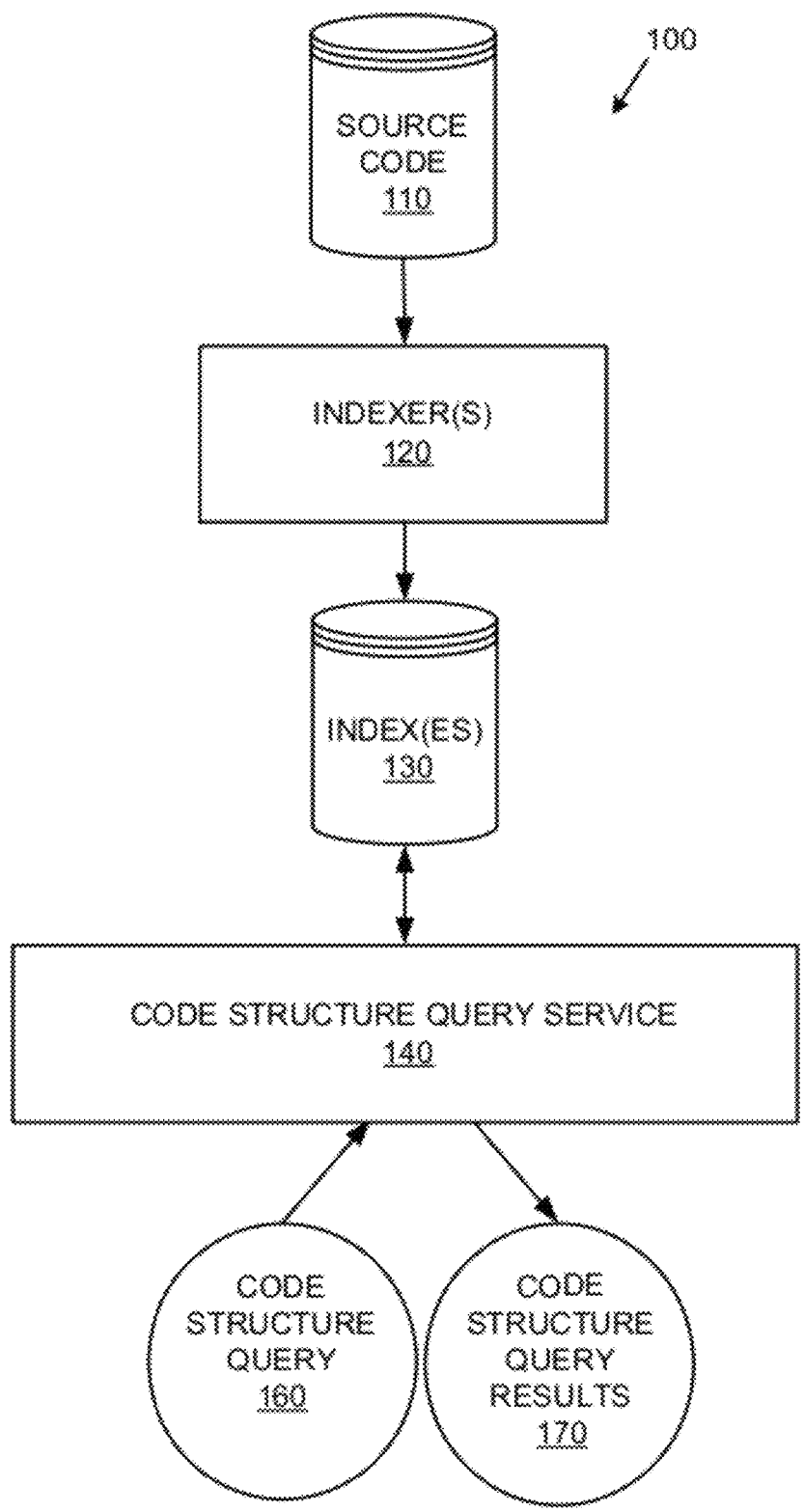
FIG. 1 is a diagram of an exemplary system for searching source code.

FIG. 1 is a diagram of an exemplary system 100 that can search source code. In the system 100, source code 110 can be indexed in one or more indexes 130 by indexer 120. For example, the indexer can parse source code as discrete segments or code elements according to the syntax of the programming language that the code is written in, and store information about the segments. The indexed segments of source code stored in the index 130 can be searched. For example, a user can search for segments of source code, such as classes, methods, functions, procedures, or the like.

A code structure query 160 can be sent to the code structure query service 140. For example, a user searching for source code can create a query with query terms and operators. For example, the code structure query 160 can have query terms and operators such as the query "class:foo AND method:bar." The user can input this exemplary code structure query into a search user interface to search for source code such as a class named foo that has a method bar.

Using code structure query 160, the code structure query service 140 can search the index 130 and determine code structure query results 170. For example, the code structure query service 140 can generate a list of query results that correspond to code elements that conform to the limitations of the user's query such as classes named foo with methods named bar.

In response to the code structure query 160, code structure query results 170 can be provided which can include links to source code.

EXAMPLE 3

Exemplary Method of Employing a Combination of the Technologies

Figure 2:
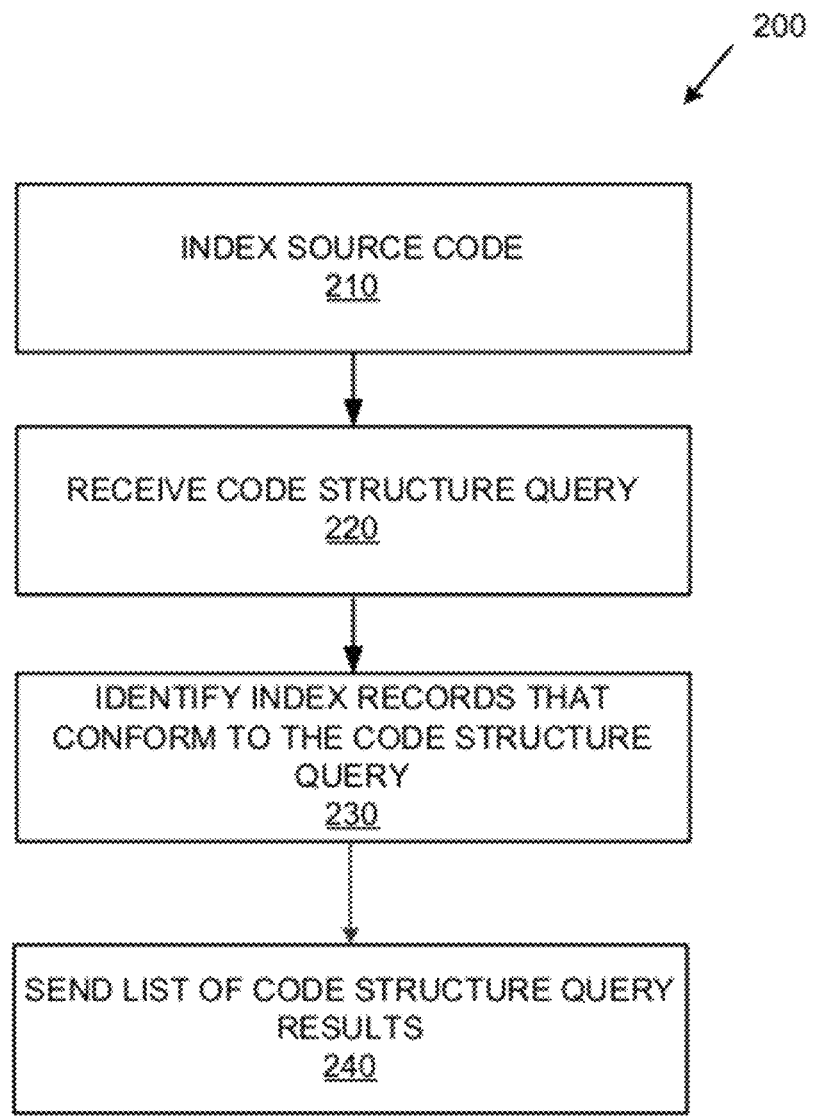
FIG. 2 is a flowchart of an exemplary method for sending code structure query results.

FIG. 2 is a flowchart of an exemplary method 200 for sending code structure query results. In the example, source code can be indexed at block 210.

At block 220, a code structure query can be received. For example, a user can send a query to search for source code that is indexed based on the code structure.

At block 230, index records that conform to the code structure query can be identified. For example, query terms including field-value expressions from the code structure query can be compared to structure fields and values of index documents to find index records that conform to the limitations of the code structure query.

At block 240, a list of code structure query results can be output or sent. For example, a list of code structure query results can be sent by a server and received by a client device for display in a user interface as options for selection by a user.

EXAMPLE 4

Exemplary System Employing a Combination of the Technologies

Figure 3:
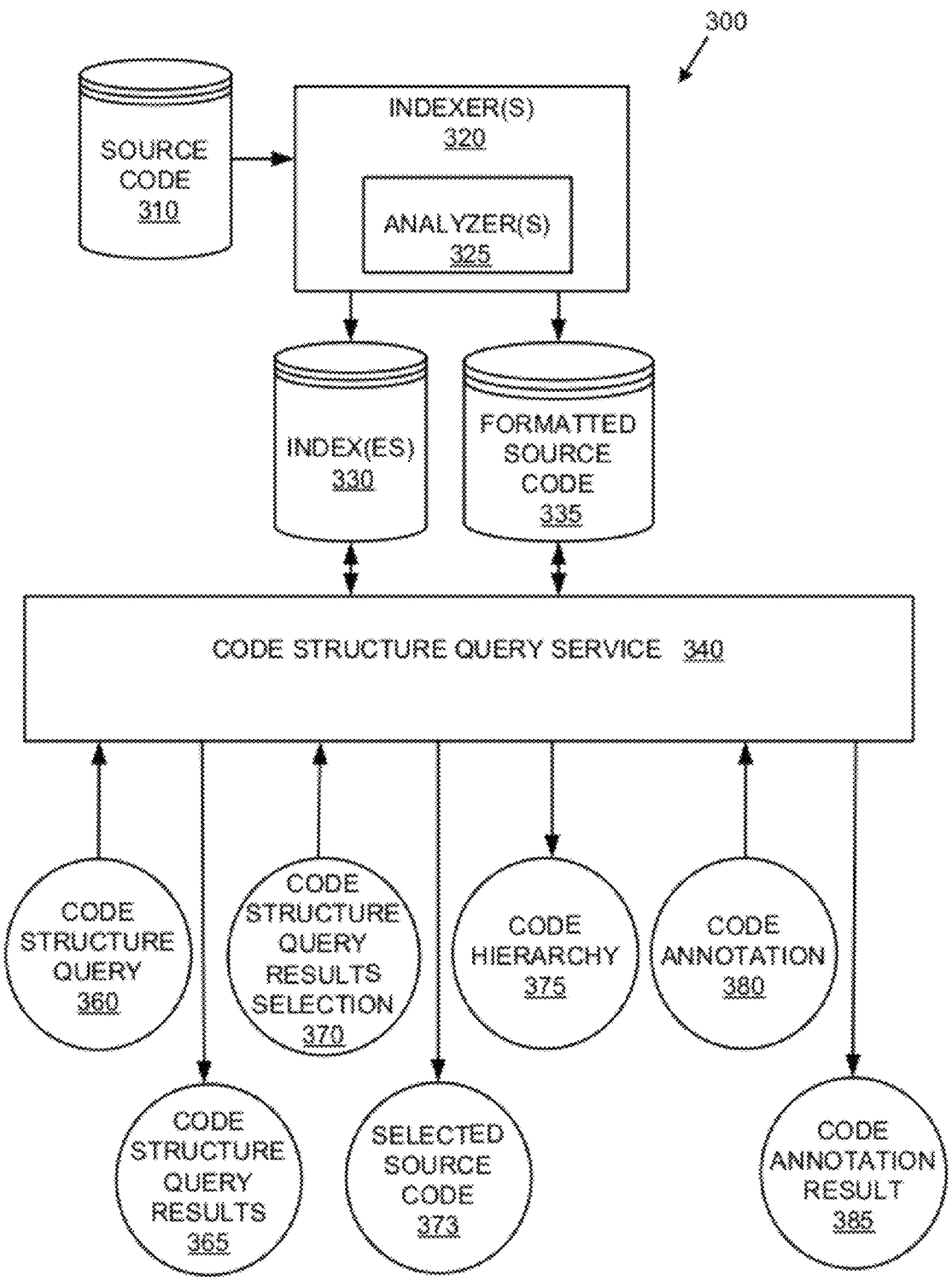
FIG. 3 is a diagram of an exemplary system that can be used for searching for source code and information about the source code.

FIG. 3 is a diagram of an exemplary system 300 that can be used for searching for source code and information about the source code. In the system 300, source code 310 can be indexed in one or more indexes 330 by indexer 320. For example, the indexer can parse source code as discrete segments or code elements according to the syntax of the programming language that the code is written in, and store information about the segments. One or more analyzers 325 configured for formatting information corresponding to various attributes of the code elements can be used to format information stored in the one or more indexes 330. Also, indexer 320 can generate formatted source code 335 from source code 310 and formatted source code 335 can be stored in a repository. For example, the formatted source code 335 can be HTML files that display source code and contain links to other formatted source code files.

A code structure query 360 can be sent to and received by the code structure query service 340. For example, a user searching for source code can create a query with query terms and operators.

Using code structure query 360, the code structure query service 340 can search the one or more indexes 330 and determine code structure query results 365. For example, the code structure query service 340 can generate a list of query results that correspond to code elements that have attributes such that their indexed information conforms to a code structure query sent by a user searching for source code.

In response to the code structure query 360, code structure query results 365 can be sent and received. For example, the code structure query results can be sent to and received by a client device for display in a user interface as options for selection to retrieve corresponding formatted source code 335. A code structure query results selection 370 can be sent to and received by the code structure query service 340 to retrieve selected source code 373. For example, a selection of one of the query results can be sent and the formatted source code corresponding to the selected query result can be sent for display in a user interface.

Also, code hierarchy information 375 can be sent and received for display in a user interface based on the selected source code query result or the formatted source code that is displayed in a user interface. For example, when a formatted source code file is selected and displayed in a user interface, the code structure query service 340 can determine hierarchy information from the index for the code element associated with the selected formatted source code 373 and the code hierarchy information can be sent to and received by a client device for display in a user interface.

A code annotation 380 can be sent to and received by code structure query service 340. For example, selected formatted source code 373 can be displayed to a user and the user can generate comments about the source code displayed and send the comments in the code annotation 380 that is associated with the selected formatted source code 373. The code annotation can be stored in the one or more indexes 330 as an annotation record. A code annotation result 385 can be sent and received for display in a user interface. For example, a user searching for comments about source code can send a code structure query that searches for conforming annotation records and one or more code annotation results can be returned to the user for display in a user interface. The annotation result can include the comments of the annotation record and one or more links to formatted source code or one or more formatted source code files.

EXAMPLE 5

Exemplary Method of Employing a Combination of the Technologies

Figure 4:
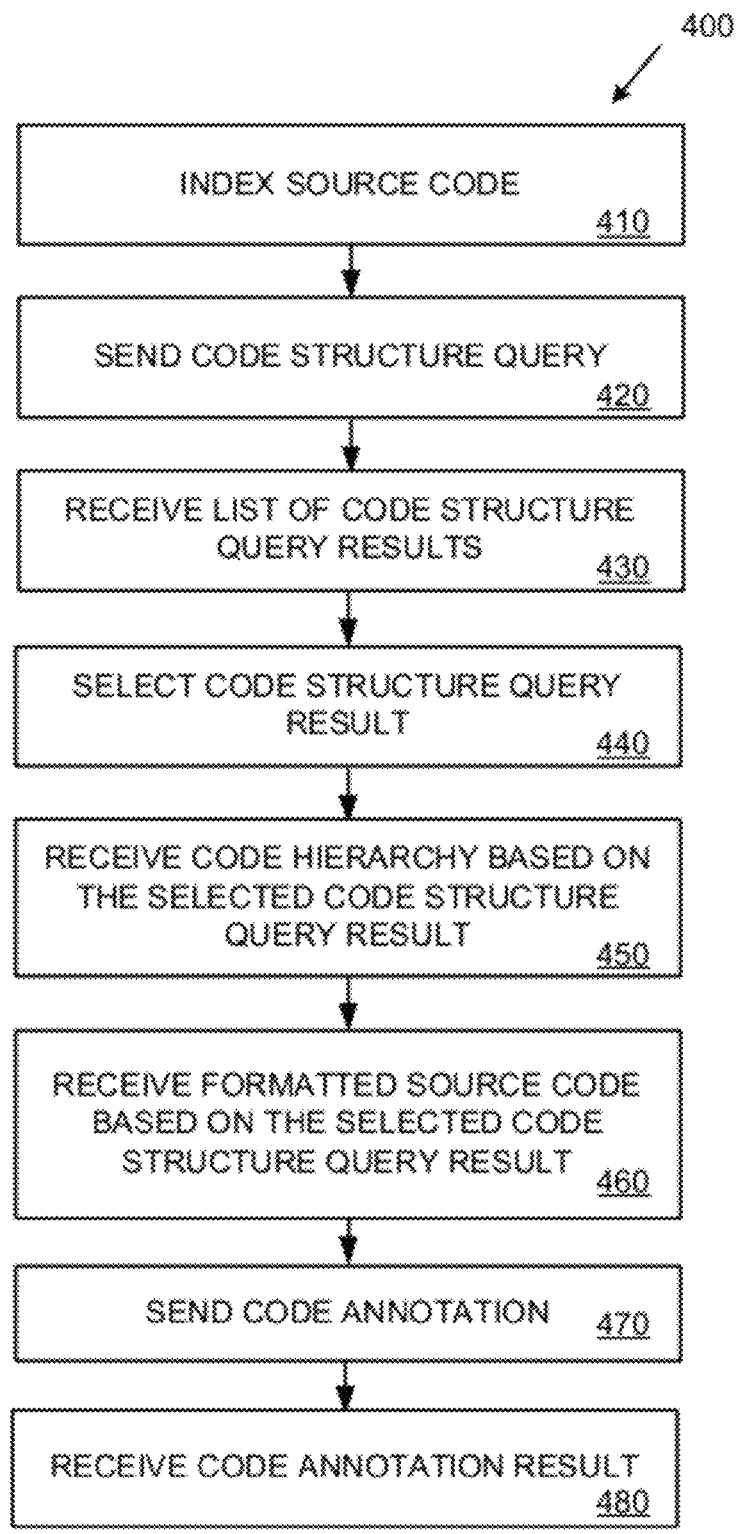
FIG. 4 is a flowchart of an exemplary method for searching for source code and information about the source code.

FIG. 4 is a flowchart of an exemplary method 400 for searching for source code and information about the source code. In the example, source code can be indexed at block 410.

At block 420, a code structure query can be sent. For example, a user can send a code structure query to a server that searches for source code indexed based on the source code structure.

At block 430, a list of code structure query results can be received. For example, code structure query results for indexed code elements that are identified as conforming to the code structure query can be sent from a server and received at a client for display in a user interface.

At block 440, one or more code structure query results can be selected. For example, a user can select a code structure query result by clicking on a hyperlink included in the result and that selection can be sent to receive source code.

At block 450, based on the selected code structure query result a code hierarchy can be received. For example, when a code structure query result is selected code hierarchy information for the corresponding code element can be determined and sent for display in a user interface.

At 460, based on the selected code structure query result, formatted source code can be received. For example, a web page containing source code with links to other source code can be received in a web browser user interface.

At 470, a code annotation can be sent. For example, a user can create a code annotation containing comments about a specified source code and the comments can be sent to a server.

At 480, a code annotation result is returned. For example, a user searching for comments can send a code structure query to search indexed annotation records and code annotation results can be sent that correspond to annotation records that conform to the code structure query.

EXAMPLE 6

Exemplary System for Searching for Source Code Online

Figure 5:
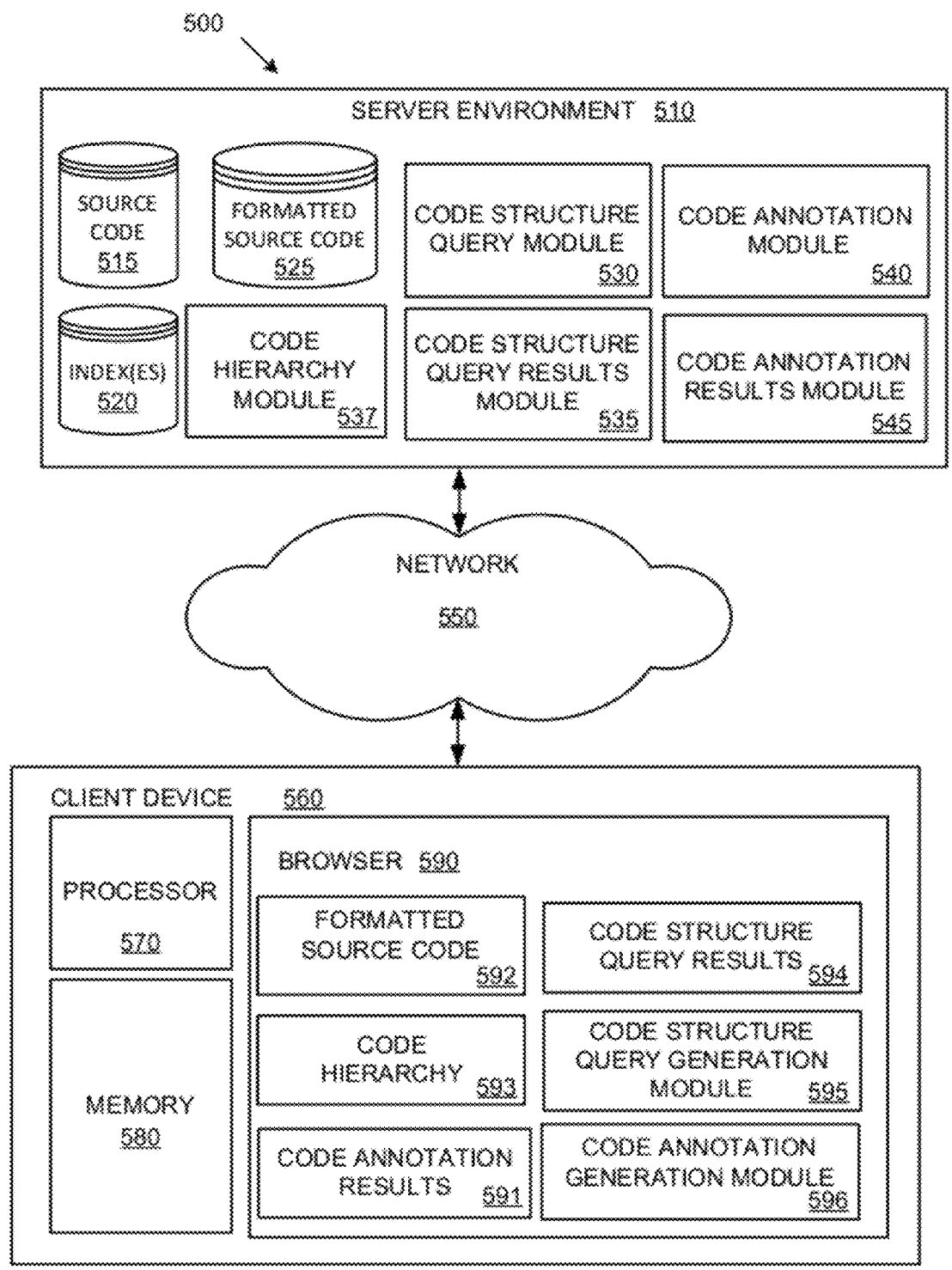
FIG. 5 is an exemplary system for searching source code online.

FIG. 5 is an exemplary system 500 for searching for source code online. The system 500 includes a server environment 510. For example, the server environment 510 can include web servers, database servers, search servers, and other hardware and/or software resources. In the example, source code 515, a source code index 520, and formatted source code 525 are stored in the server environment 510. Server environment 510 can also include a code structure query module 530, code structure query results module 535, code hierarchy module 537, code annotation module 540, and a code annotation results module 545. The code structure query module 530 can be for receiving code structure queries for searching source code. The code structure query results module 535 can be for identifying conforming index records and sending code structure query results based on a code structure query. The code hierarchy module 537 can be for determining code hierarchy information for a code element. The code annotation module 540 can be for creating annotation records. The code annotation results module 545 can be for generating and sending code annotation results. In one implementation of the server environment it can be a code structure query service and implement the functionality of a code structure query service.

The server environment 510 is connected to a network 550. For example, the network 550 can be a global communication network, such as the Internet. The network 550 can represent various network resources that are needed for end-to-end communication between the server environment 550 and one or more client devices (e.g., client device 560). For example, the network 550 can represent the Internet in combination with other types of networks, such as mobile phone networks (e.g., cell phone networks), Wi-Fi networks, and the like.

The server environment 510 can be used to search for source code in combination with client devices such as client device 560. Client device 560 can include a processor 570, memory 580, a web browser 590 (e.g., Internet Explorer®). The web browser 590 can receive and display code annotation results 591, formatted source code 592, code hierarchy information 593, and code structure query results 594. The web browser 590 can also include a code structure query generation module 595 for generating a code structure query, and a code annotation generation module 596 for creating a code annotation. The browser 590 can also send code structure queries, code annotations, and selections of code structure query results.

EXAMPLE 7

Exemplary Method of Employing a Combination of the Technologies

Figure 6:
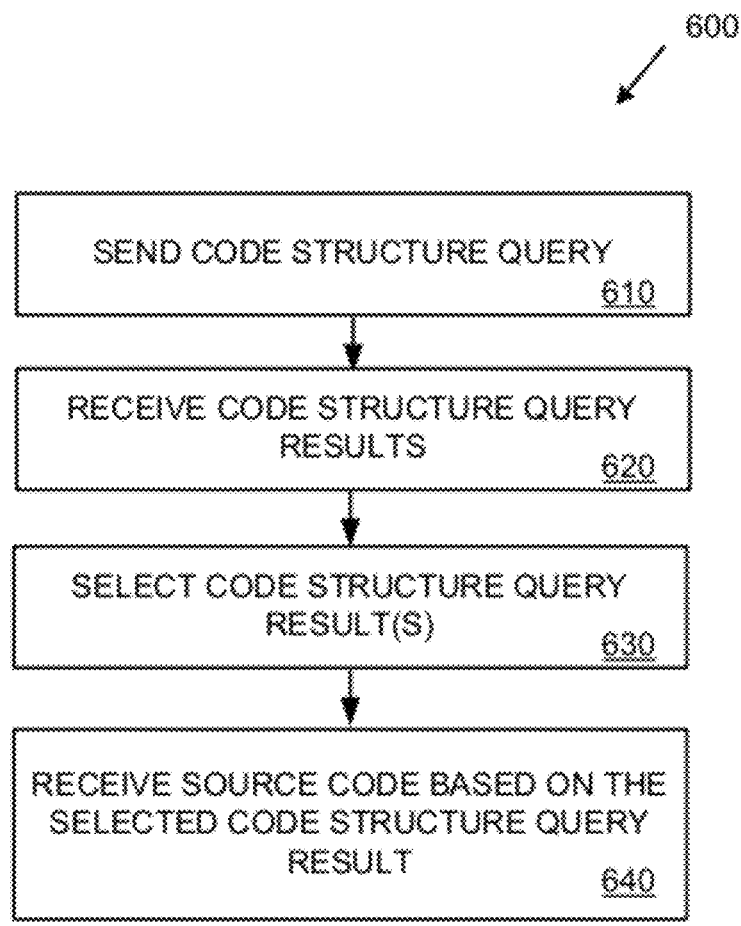
FIG. 6 is a flowchart of an exemplary method for searching source code.

FIG. 6 is a flowchart of an exemplary method 600 for searching for source code. In the example, a code structure query can be sent at block 610. For example, a code structure query including field-value expressions and Boolean operators can be sent from a client device to a server.

At block 620, code structure query results can be received. For example, a list of code structure query results can be received for display in a user interface.

At block 630, one or more code structure query results can be selected. For example, a user can select a code structure query result and that selection can be sent to receive source code.

At 640, based on the selected code structure query result, formatted source code can be received.

EXAMPLE 8

Exemplary Client User Interface

Figure 7:
FIG. 7 illustrates an exemplary client user interface for searching source code.

FIG. 7 illustrates an exemplary client user interface 700 for searching source code. The client user interface 700 can include a formatted source code window 710, a code structure generation module 720, code structure query results window (not shown), code annotation (not shown), and a code hierarchy window 730. In one implementation, the client user interface 700 can be implemented as a web interface in a web browser such as web browser 780. In other implementations, the client user interface 700 can be a local interface for a local network or local computing device or system.

The formatted source code window 710 can include displayed source code from a formatted source code file such as the source code for the class PetStoreAdminClient 713. The source code for the class PetStoreAdminClient 713 includes comments 715 designated by comment markers. The comments 715 can include an author name 717 of a person that wrote the comments 715. In the displayed source code for the class PetStoreAdminClient 713, text that references other code elements or source code can have linking functionality to the referenced source code for retrieval. For example the text "ordersToggleButton" 714 can be a link (e.g., hyperlink) to retrieve the source code for the code element "ordersToggleButton." A user can select or click on the link and the formatted source code can be retrieved from a server and displayed in the formatted source code window 710. The formatted source code window can have scrolling functionality and can be accessed using a window tab 719.

The code structure generation module 720 can include code structure query generation field 723, and a search button 725. The code structure query generation field 723 can be used to create a code structure query. A user can type query terms, operators and limiters into the code structure query generation field 723, such as the exemplary displayed query "type:class AND implements:Runnable." The code structure query generation field 723 can be used to build a code structure query of arbitrary length or a specific length. The search button 725 can be used by a user to send a code structure query generated in the code structure query generation field 723.

The code hierarchy window 730 can include code hierarchy information such as the type hierarchy information displayed under the type hierarchy information tab 733 and call hierarchy information (not shown). The type hierarchy information can include a listing of code elements that are parents or children of the code element or other code hierarchy information. The hierarchy information 735 for the class PetStoreAdminClient 713 includes a listing of the class and under the class "javax.wing.JFrame" is listed which is extended by the class as indicated in the code of the class. Also listed under the class is "java.beans.PropertyChangeListner" which the class implements as indicated in the code of the class.

Figure 8A:
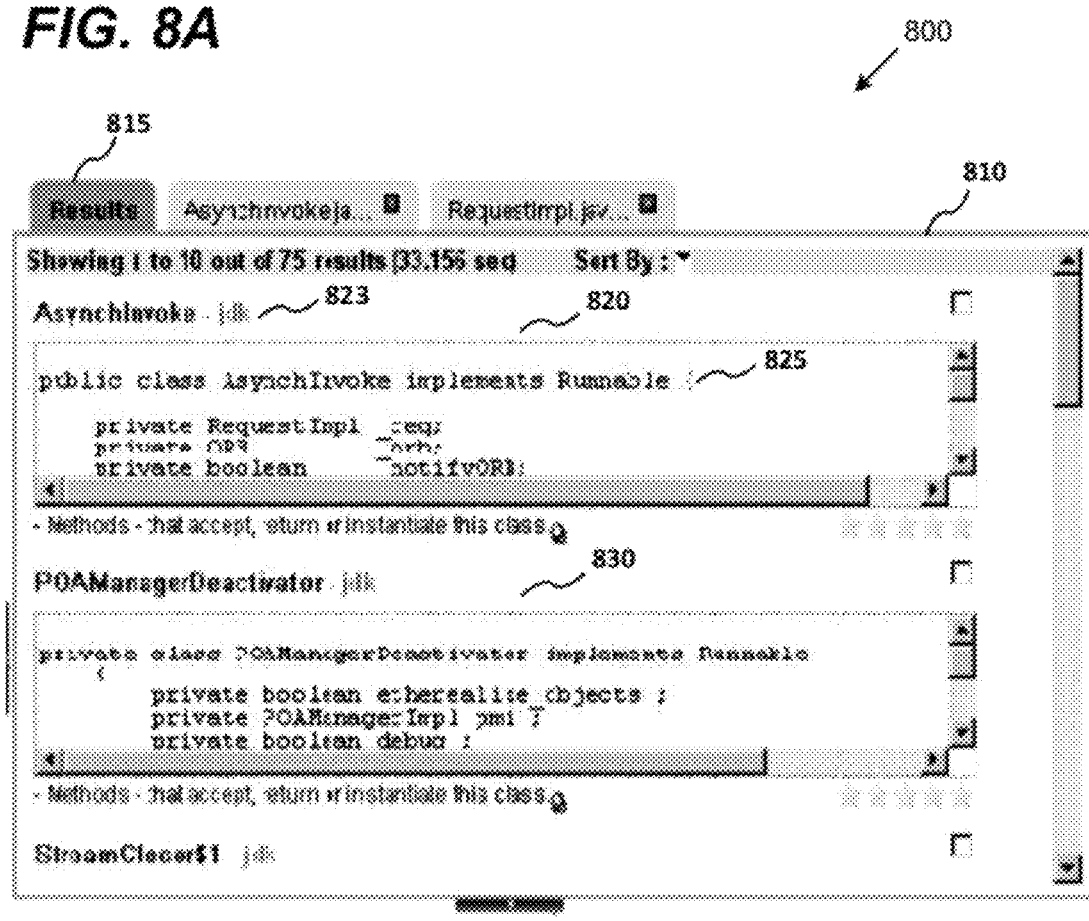
FIG. 8A shows a code structure client user interface with code structure query results.

The client user interface can also include windows for code structure query results such as code structure query results window 810 of FIG. 8A. For example, a user can select the code structure query result tab 760, and the window 810 with one or more code structure query results can be displayed.

The client user interface can also have an address field for directing the client user interface to an online resource. For example, the client user interface can be implemented in web browser and the address field 770 can be used for an internet address that allows access to an online source-code search environment.

EXAMPLE 9

Exemplary Client User Interface with Code Structure Query Results

FIG. 8A shows a code structure client user interface with code structure query results. The client user interface 800 can also include windows for code structure query results such as code structure query results window 810. For example, a user can select the code structure query results tab 815, and the window 810 with one or more code structure query results such as code structure query results 820 and 830 can be displayed.

A code structure query result such as code structure query result 820 can have functionality (e.g., hyperlink) to retrieve the source code of the code element. The code structure query result 820 can include a name of the code element for the result such as code element name 823. In one implementation, the code element name 823 can be functional to retrieve the source code. The code structure query result can also include code text 825 from the code element with the code element name 823.

EXAMPLE 10

Exemplary Code Annotation Result

Figure 8B:
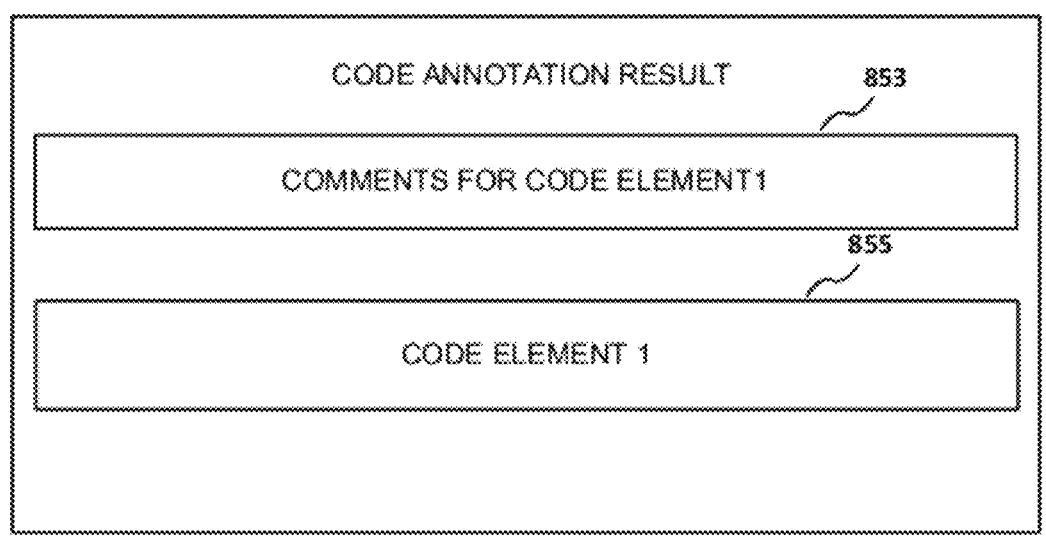
FIG. 8B is an illustration of an exemplary code annotation result.

In any of the examples herein, client user interfaces can receive and display a code annotation result. FIG. 8B is an illustration of an exemplary code annotation result 850. The code annotation result 850 can include comments about a code element such as comments 853.

The code annotation result 850 can include the code element 855 that corresponds to, is referenced by, is associated with, or is linked to the comments 853. The code element 855 can be the entire code element, a preview of the code element, or a representation of the code element such as a code structure query result for the code element.

EXAMPLE 11

Exemplary Index Document

Figure 9:
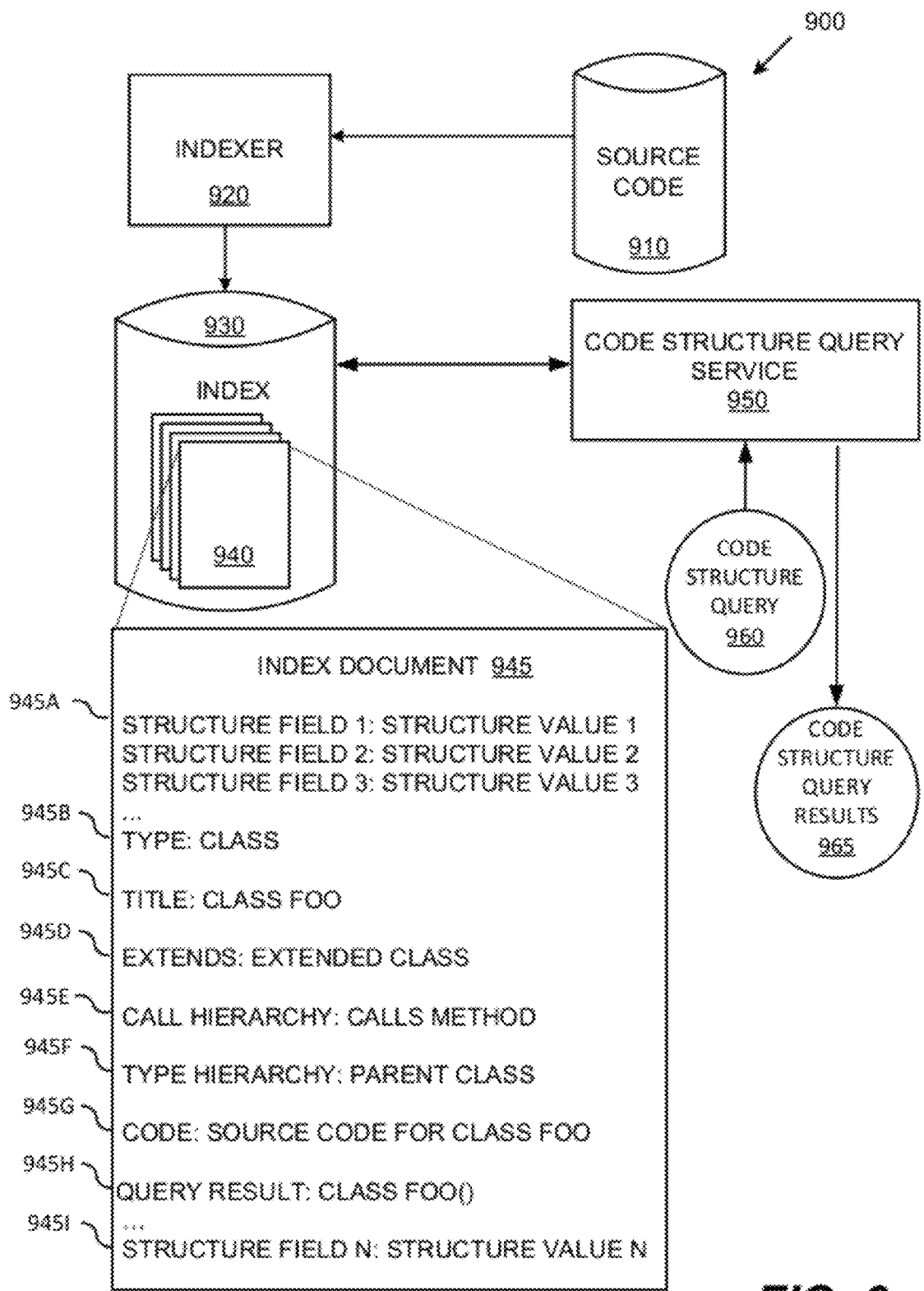
FIG. 9 is a diagram of an exemplary index document used for searching source code.

In any of the examples herein, an index document can be an index of information for a code element. FIG. 9 is a diagram of an exemplary index document 945 used in a system 900 for searching source code. Index document 945 can be an index for a code element such as a class FOO. Index document 945 can include fields with associated field values such as structure fields and associated values 945A-I. An index document can include structure fields and structure values that contain information about attributes of the indexed code element such as names of code elements, a code structure query result, the text of the code element, an identifier of the code element, dependencies of the code element, hierarchy information for the code element, and information based on other attributes of the code element. The index document can include fields and associated values that include information entered by an indexer or a user.

In the system 900, source code 910 can be indexed by indexer 920 and stored in index 930. Indexer 920 can create index documents 940 based on code elements such as index document 945.

The indexer 920 can input information into the fields and associated values of index document 945 by parsing source code based on a programming language. The index document 945 can include a structure field and associated value such as structure fields and values 945B-H. Structure field and value 945B can include information about the code element type. Structure field and value 945C can include information about the title of the code element. Structure field and value 945D can include information that the code element extends another code element. Structure field and value 945E can include call hierarchy information. Structure field and value 945F can include type hierarchy information about the class. Structure field and value 945G can include the text of the source code for the code element. Structure field and value 945H can include information for a code structure query result. Also index document 945 can include a structure field and associated value such as a code field and value 945G that includes the code of the code element. A structure field of the index document 945 can have a field identifier such as "TYPE" of structure field and value 945B. In some implementations the field identifier is based on a code attribute. The field identifier can be matched or identified as correspond with field terms of a code structure query during a search. Also, a structure value of the index document 945 can be information about the code attribute that the associated structure field is based on, such as the structure value "CLASS" of structure field and value 945B. The structure field and value 945B indicates that the code element has an attribute such as a type and that the code element type is a class. Structure values can be matched or identified as correspond with value terms of a code structure query during a search. Structure values can be extracted text from code elements or variations of the extracted text processed by an analyzer. For example, an analyzer can remove unnecessary words or characters or add words or characters to extracted code text.

In the exemplary system 900 a code structure query service 950 can use the index 930 of index documents 940 to search the indexed source code. A code structure query 960 can be sent to the code structure query service 950 and the query service can use the index to return a code structure query response 965.

EXAMPLE 12

Exemplary Annotation Record

Figure 10:
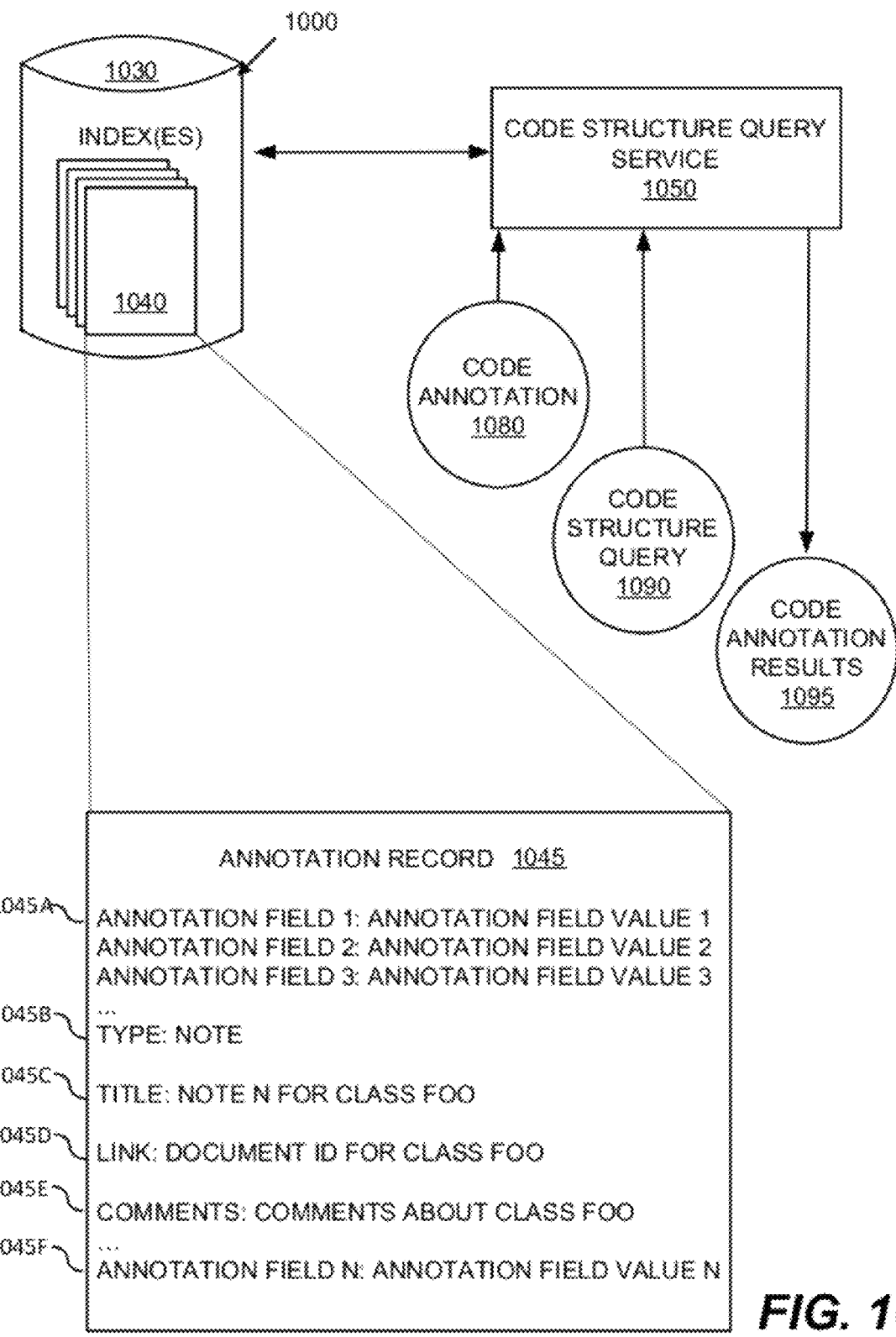
FIG. 10 is a diagram of an exemplary annotation record used in a system for searching source code with associated annotation records.

In any of the examples herein, an annotation record can be an index of source code comments for a code element. FIG. 10 is a diagram of an exemplary annotation record 1045 used in a system 1000 for searching source code with associated annotation records. Annotation record 1045 can be an index for a source code comment for a code element such as a class FOO. Annotation record 1045 can include fields with associated field values such as annotation fields and associated values 1045A-F. An annotation record can include annotation fields and values that contain information about a code annotation of its associated indexed code element such as a type (e.g., annotation or note), title of the annotation, an associated code structure query result, an associated code element, an associated formatted source code file, comments about the associated code element, and a name for the author of the comments. In one implementation, at least some of the information included in the annotation record such as the comments can be provided by a user through a client user interface. In another implementation at least some of the information included in the annotation record can be generated automatically.

In the system 1000, indexed source code and annotation records can be stored in one or more indexes 1030. The code structure query service can create annotation records 1040 based on code annotations such as code annotation 1080. The information provided in the code annotation 1080 can be formatted and input as annotation fields and associated field values, such as annotation fields and field values 1045A-F with annotation information about class FOO.

In the exemplary system 1000 a code structure query service 1050 can use the one or more indexes 1030 that include annotation records 1040 to search for annotation records 1040 and associated source code. A code structure query 1090 can be sent to the code structure query service 1050 and the query service can use the query terms and operators to find corresponding annotation records to return annotation results 1095. For example, a code structure query can include a field-value expression such as "TYPE:NOTE," in the code structure query "TYPE:NOTE AND COMMENTS: CLASS FOO." Annotation records that have comments that include the text "class foo" can match or conform to this code structure query. Annotation results for the identified matching or conforming annotation records can be sent to a client device for display in a user interface.

EXAMPLE 13

Exemplary Code Annotation

In any of the examples herein, a code annotation can include comments for a code element that are not found in the source code for the code element. The code annotation can be generated by a user. For example, source code can be displayed to a user and the user can generate comments about the source code and send the comments in the code annotation. The code annotation can be linked, correspond to, or reference the source code or index of the source code commented on so that it can be searched and retrieved with the source code of the code element. The code annotation information can be stored in the one or more indexes in an annotation record. In one implementation, the user can create a code annotation using a web browser user interface by typing text containing comments about a specified source code and the comments can be sent to a server. The server can create an annotation record and corresponding code annotation result based on the code annotation.

The comments of a code annotation can include words, phrases, sentences, text, or other writing. The comments can convey information about the source code to other viewers of the comments and source code. The code annotation can also include a name of the person that wrote or provided the comments about the code element (e.g., author). The author information can be useful to further the analysis of the source code. The comments can include comment markers or not. A code annotation can also include information about a code element such as a title of the annotation, an associated code structure query result, an associated code element, or an associated formatted source code file.

In one implementation, at least some of the information included in the code annotation such as the comments can be provided by a user through a client user interface. In another implementation at least some of the information included in the code annotation can be generated automatically.

EXAMPLE 14

Figure 11:
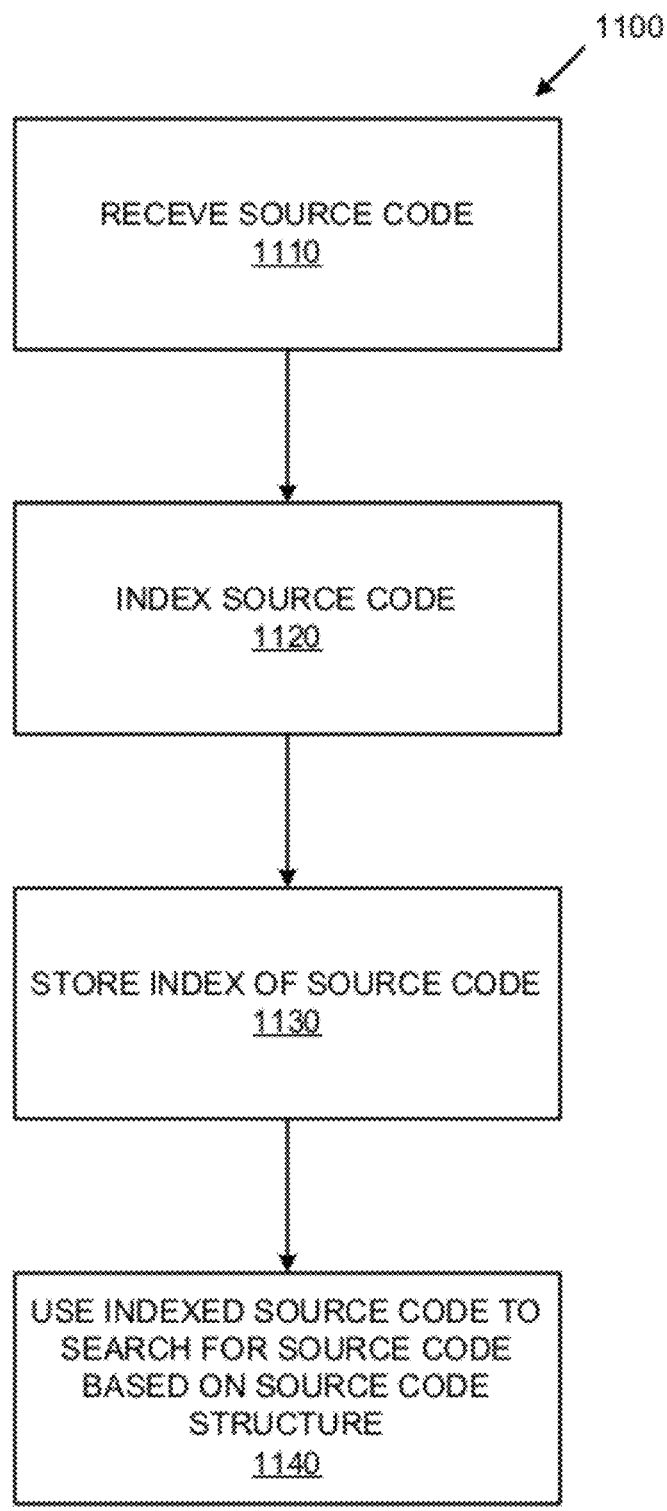
FIG. 11 is a flowchart of an exemplary method for using an index of source code to search for source code based on source code structure.

Exemplary Method for Using an Index of Source Code to Search for Source Code FIG. 11 is a flowchart of an exemplary method 1100 for using an index of source code to search for source code based on source code structure. In the exemplary method, source code can be received at block 1110. For example, source code can be received by an indexer that parses the source code based on a programming language.

At block 1120, source code can be indexed. For example, source code can be parsed according to a programming language and code elements with attributes can provide information for structure fields and structure values of index documents.

At block 1130, the index of source code can be stored. For example, the indexed source code can be stored in an index.

At block 1140, indexed source code can be used to search for source code based on the structure of the source code. For example, structure fields of index documents of the indexed source code can be searched or queried to determine code structure query results that can retrieve source code when selected.

EXAMPLE 15

Exemplary Architecture for Employing a Combination of the Technologies

Figure 12:
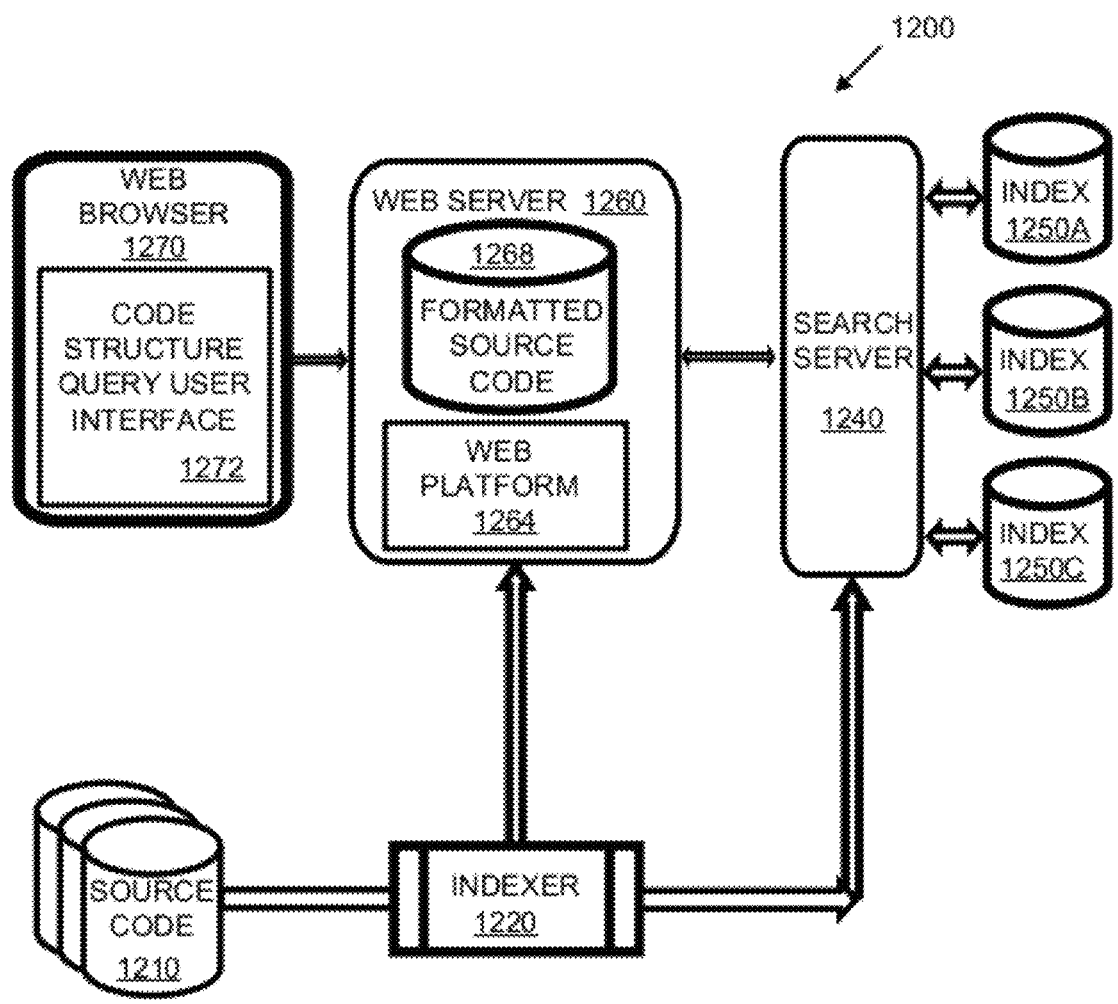
FIG. 12 is a diagram of an exemplary architecture for searching source code.

FIG. 12 is a diagram of an exemplary architecture 1200 for searching for source code. The architecture can be scalable. Support for programming languages can be added by adding a parser for other languages which can extract and store the corresponding code elements into an index and that can generate smart HTML versions of source code files.

In the architecture 1200, source code 1210 can be indexed by indexer 1220. The indexer 1220 can parse source code according to a programming language. In one embodiment of the indexer, the indexer 1220 can use the Eclipse JDT parser to parse source code or some other parser can be used. Indexed code elements with attributes and dependencies can be stored in one or more indexes 1250A-C accessible to search server 1240. The indexer 1220 can also produce formatted source code 1268. Formatted source code 1268 can be intelligently formatted HTML files which are used in a web component for cross navigation between formatted source code online. Formatted source code 1268 can be accessed by web browsers such as web browser 1270. Also, web browser 1270 can include a code structure query user interface 1272.

The search server 1240 can search the index of code elements of source code. In one embodiment, the search server 1240 can be implemented through Apache Solr server or some other server. In one example embodiment, the search server 1240 can both store and retrieve the information through a common application programming interface (API) or by some other technique. In one implementation, the search server can interact with a web server 1260 with web platform 1264 to provide the functionality of a code structure query service for searching source code online.

EXAMPLE 16

Exemplary Indexing of Source Code

In any of the examples herein, an indexer can index source code according to the source code's structure at least by parsing source code based on the syntax of the source code written in a programming language. The indexer can parse source code into discrete segments of source code. That is to say, the indexer can divide up the source code (e.g., text of the source code) into discrete segments of source code. The segments can be functional units (e.g. a class), or portions of the text of the source code (e.g., a name of a class). In one implementation, a parser can extract information (e.g., words, phrases, text segments, code segments, values) from the text of code elements. The extracted information can be used to create index documents for the code elements. For example, for the source code segment "public class BankingClient extends Bank," an indexer can divide up the code and extract information including the words "public" "class," and "BankingClient." Because the source code segment is arranged according to a programming language, the indexer can determine that the code element is a "class" and that it is a "public" class. Also, the indexer can determine that the class is named "BankingClient" and that the class extends the code element Bank.

In one implementation, the indexer can identify code elements that code developers can search for. For example, segments of source code can be code elements, such as classes, methods, functions and the like. The indexer can determine code elements based on source code files or from parsing the source code according to a programming language. For example, the indexer can identify that a class contained in a source code file is a code element because source code files can be organized so that a file (e.g., each file) contains one respective code element. That is to say, the indexer can use the content of individual source code files as discrete code elements rather than extracting textual code segments or statements. Additionally, the indexer can parse source code to extract information for index records, information for structure values, information for structure fields, values, source code text, attributes, code hierarchy information, dependencies between code elements, and other like information that can be stored or indexed. In a further example, once a class is indexed, a code developer wanting to reuse the class can search for the class as a code element of the source code or software.

While indexing, the segments of source code (e.g., code elements) can be determined by parsing the source code according to a programming language's syntax. By parsing the source code, the indexer can use the structure (e.g., semantic structure) of the source code to determine code elements. For example, an indexer parsing source code according to the Java language can extract a class as a code element because the parser can determine the boundaries (e.g., beginning, end or body) of a class based on the syntax of the Java language. The indexing can be done before runtime or after runtime. Indexing code before runtime can speed up the process for large software repositories.

When indexing source code files, relevant attributes, information, or values for respective source-code files can be identified and extracted. The indexer can determine the attributes of a code element by parsing sub-portions (e.g., text) of the code of the code element. The attribute can be recognized and extracted by parsing according to the programming language of the code. For example, a class may implement an interface and the indexer can determine that attribute. This can be achieved because the indexer can determine from the text and syntax of the code that the class implements a specified interface. For example, the indexer can determine that the code uses the word "implements" which can be a reserved word in the programming language used to write the code and the name of the specified interface can follow the reserved word. In one exemplary embodiment of the indexer, the indexer can use the Eclipse JDT parser to parse source code. In other embodiments of an indexer other parsers can be used. A parser can be specific to a particular programming language.

While indexing the source code, the indexer can produce formatted source code and index records. Index records can be index documents, or other forms of indexed information. Index records can include information for, code elements, code element attributes, structure fields, structure values, and code element hierarchies (e.g., dependencies). The indexer can extract the information for index records from code text segments or pieces of code including words, phrases, or a segment of the source code. If the information is for a structure value and is associated with a code element attribute, the information can be formatted or processed by an analyzer specified for the code element attribute. For example, if a class name is a continuous string of multiple words (e.g., BankingBusinessClient), the analyzer for the class name attribute can format the name to be multiple words (e.g., Banking Business Client). Code element attributes can have respective associated analyzers to format information indexed from code elements.

The indexer can parse the class to identify attributes of the class and input extracted information into index records based on those attributes. The indexer can input the extracted information into structure fields and value fields of the index records stored in the index. For example, an indexer can extract a class as a code element, and for the code element it can input structure fields and structure values into an index document for the class. Structure values for the class can be the name of the class, the methods of the class, and other attributes of the class. Also, the index record for the class can have a structure field designated for the code of the code element where the indexer inputs the source code for the class as the structure value that is associated with the designated structure field.

In addition to index records the indexer can produce formatted source code that can be used to display source code in a user interface. The formatted source code can include formatted source-code files. The formatted source code can be intelligently formatted HTML files that include the source code or code element. In one example, the formatted source code documents can be used in a web component for cross navigation between source code online. In another example, the source-code documents can be locally stored formatted files that contain source code.

EXAMPLE 17

Exemplary Structure Field

In any of the examples herein, a structure field can be information in an index record that corresponds to a structural attribute of the code element. The source-code attribute can be based on the text, syntax, or functionality of a code element. The structure field can have a structure value associated with the structure field. For example, a method with the name "calculateInterest" can have a structure field associated with an attribute of the method such as the method's name. For this method, the structure field can be "methodname," and the structure value that corresponds to the structure field can be the specified name "calculateInterest." In some implementations, structure values can be paired with structure fields. In other implementations, each structure field can have more than one structure value.

A structure field can be stored in an index document for a code element. For example, when a parser parses a code element for indexing, it can identify an attribute and input a structure field and corresponding structure value into the index document for the code element. Structure fields can be compared with query terms to determine code structure query results that can be returned in a search. For example, a search engine can search an index to find index documents with similar structure fields and structure values.

In searching for source code, structure fields can be used to determine code structure query results based on attributes of code elements such as classes and methods. Searching source code based on its structure can efficiently isolate source code desired by a user. For example, for the Java programming language, "EXTENDS" can be a structure field that corresponds to code elements with the attribute of extending (e.g., a class). The code element that extends the class can have "extends" as part of the syntax or text of the code that can be extracted when parsed. In other examples, a structure field can be based on a reserved term or keyword in a programming language or based on some other syntax or textual element in source code that can be identified in the source code text by parsing the source code according to the syntax of a programming language. For example, for Java language structure fields can be based on a name of a code element, full text of the code element, inheritance, implementing, calling other code elements, importing, dependencies or the like. These exemplary structure fields can be "classname," "methodname," "inherits," "implements," "calls," "imports," or other structure fields based on identifiable attributes permitted by the programming language. In implementations for other languages the structure fields can be based on attributes identifiable in the source code written in those languages.

In a further exemplary implementation, while parsing the source code of code element A, a parser can encounter that code element A "implements" code element B and the parser can store or input a structure value and structure field that indicates code element A implements code element B. For example the parser can store the indication of a code attribute in an index document or some other data store such as a database or the like. After structure fields are associated with a code element in a data store, the data store can be searched or queried to find the structure fields associated with the code element. For example, an index document for code element A can be searched for a field that indicates code element A implements other code elements.

Table 1 shows structure fields that can be designated for the Java language. These examples are provide for explanation and other structure fields using different words can be determined and created based on the syntax of programming languages and written source code.

TABLE 1

| Structure Fields |
| --- |
| Structure Fields |
| calls |
| classname |
| creates |
| extends |
| implements |
| imports |
| methodname |

EXAMPLE 18

Exemplary Structure Value

In any of the examples herein, a structure value can be information in an index record that gives a value for or corresponds with a structure field. The information of a structure value can correspond to an attribute of a code element (e.g., code attribute). For example for an index record of a method that has a structure field of "methodname" the corresponding structure value for the field can be the name of the method. This information about the attribute (e.g., the name of the method) can be extracted from the code of the code element. For example, when a parser parses a code element for indexing, it can input information for code attributes into an identifiable field such as a structure value associated with a structure field. The structure value and field can be used to determine conformance of the indexed code element when the index record is searched in the index.

The values, information, or text of the structure value can include text extracted from the code element as well as additional information. In one implementation extracted text can be processed or formatted by an analyzer before being stored in a structure value.

EXAMPLE 19

Exemplary Code Element

In any of the examples herein, a code element can be a portion of the text of source code. For example, a code element can be a segment of source code such as a class, a method, a function, routine, a statement, a procedure, comments, or other like logical code elements.

Code elements are determined based on source code files or from parsing the source code according to a programming language. For example, a class contained in an individual source code file can be a code element because source code files can be organized so that a file (e.g., each file) contains one respective code element. That is to say, the content of an individual source code file can be a code element. Also, for example, a class that is written in a source code file or document can be indexed as a code element.

Code elements can be combinations of code elements. For example, both a designated method of a class and the class itself that includes the method can be different code elements. Also, for example, a code element can be source code comments which are designated by a comment marker or markers. A code element can be a combination of other code elements. For example, a code element can be a comments section of a class, the class, or both the comments and the class combined. Code elements can have an organization based on the programming language of the source code. Various attributes of code elements can be indexed based on a chosen indexing scheme.

In other implementations, a code element can be designated from the syntax of a programming language. A code element can be determined, identified, or extracted by parsing source code according to the syntax of a programming language. For example, a code element can have attributes that can be identified or determined by an indexer. For example, an indexer can parse source code written in the C++ programming language according to the syntax of the language to extract code elements, such as classes, functions and the like. Attributes of the code elements can be used to create index documents with information about the code elements. In one implementation, code elements can be identified and extracted because a parser can identify the beginning, end and body of the code element based on the syntax of the programming language. A code element can be a logical unit of source code that has functionality. The logical unit can have text that indicates its beginning and end as a unit of code specified functionality. For example, a parser that parses source code according to a programming language that allows for classes can identify that a segment of source code is a class because the class is written in a syntax of the programming language. The parser can identify what text is included in the class. The parser can also identify where the class begins and ends. The parser can determine that the logical unit is a class. In another implementation, code elements can be discrete segments of source code that can be searched for by a user. For example, for a programming language that has logical segments of code (e.g., classes, methods) that have functionality as a logical segment, code elements can be based on those logical segments because a user would want to search the source code based on those logical segments of the code.

By indexing source code by code elements the source code can be searched based on the structure of the source code. A user can search for code elements that have attributes and functionality that is desired by the user.

EXAMPLE 20

Exemplary Code Structure Query

In any of the examples herein, a code structure query can include query terms and operators. Query terms can be combinations of text, words, phrases, expressions, field-value expressions, field terms, value terms, character strings, or the like. A code structure query can include operators, including Boolean operators such as "AND," "OR," and "NOT," or other operators.

A code structure query can include field-value expressions. A field-value expression can include a field term and one or more value terms. For example, the field-value expression "class:server" has class as its field term and server as its value term. A field term can indicate what structure field's associated value in an index record can be used to compare with the value term. The value term can be compared with the structure value of the indicated field. A field term can indicate what associated attribute a user is searching for in the source code and the value term can indicate acceptable or conforming values for those attributes found in code elements. In some implementations query terms can be used to search annotation records by comparing structure fields and values with annotation fields and values or annotation records.

In one example of a code structure query, a user searching for source code can enter the query "class:server AND function:send." In one implementation, this query can return code structure query results for classes that include the text "server" in the class name and that have a function that includes the text "send" in the function name. Using the code structure query structure fields and structure values of index records can be searched to identify the code elements with the relevant specified attributes.

In another implementation, a code structure query can have characters with a specified function such as a variable character that indicates variations of entered terms can be acceptable, matching or conforming to the entered terms.

The code structure query terms can be arranged according to a syntax. For example, if a user wanted to search for a class named Foo the query for the search can be "type:class AND classname:foo." Where "type" indicates that the code element has an attribute of having a type, and "class" indicates that the conforming code elements have the type of a class. Also, the orientation of the terms of an expression can be functional. For example, "classname" and "foo" separated by a colon can indicate that the term to the left of the colon is a field term and the term to the right of the colon is a value term. In other implementations other syntaxes and orientations for terms can be used.

In one implementation, a query that matches or compares text terms can be used. For example, the code structure query "type:class AND classname:foo AND bar" can indicate conforming code elements can be classes with the text "foo" in the classname and that include the text "bar" in the source code of the element. A free text term such as "bar" not in a field-value expression can be compared against a predetermined structure value such as one that holds the source code for the code element or any other structure value for an indexed code element.

Query terms, or operators for a code structure query can be entered by a user, or automatically. For example, a user can enter query terms into a text or query field of a user interface to search for source code.

In another example, query terms, or operators, can be automatically entered into a code structure query. For example, a user can select a user interface field option and a query term, or operator, indicating by the selection can be automatically added to a code structure query.

EXAMPLE 21

Exemplary Code Structure Query Result

In any of the examples herein, a code structure query result can be a result determined in response to a code structure query. A code structure query result can be used to retrieve or reference source code, a code element, or an index document. For example, a user can select a code structure query result by mouse clicking on the code structure query result and the selection can retrieve the associated code element.

The code structure query result can be displayed in a user interface at a client. In one implementation, code structure query results can be implemented in part as links in a web page displayed in a web browser or user interface using internet technologies such as HTML, hyperlinks or other internet technologies. A code structure query result can include an identifier of the source code or element that it can retrieve. Also, a code structure query results can include a portion or all of the text of the code element. For example, the code structure query result can display the first 100 characters of the code element so that a user can preview the source code. A code structure query result can include a hyperlink to retrieve an HTML document containing the source code or code element. Also, for example a user searching for source code can view or scroll through code structure query results to view available source code hits. The code structure query results can be displayed in a list.

A code structure query result can be ranked and displayed or listed in an order of relevance. An order of relevance can be determined by a ranking based on a heuristic that determines relevance. For example, code structure query results can be ranked based on an algorithm such as a statistical algorithm or some other algorithm where a query is matched with source code or a code element. Code structure query results can be paginated and displayed in various pages that can be accessed by selecting a pagination option, such as a next page, numbered page, or the like. Also, code structure query results can be displayed in a single page or window.

EXAMPLE 22

Exemplary Index Records that Conform to a Code Structure Query

In any of the examples herein, index records that conform to a code structure query can be identified based on comparing query terms of the code structure query with structure values associated with structure fields of an index record. For example, based on the indicated operators of the code structure query, the query terms can be matched or compared against structure values. In one implementation query terms can be matched in whole in part or as variations to structure values based on syntax and operators of the code structure query. In another implementation, Boolean operators act on the query terms to indicate limitations, constraints, or boundaries for the search. A conforming index record can be one that includes structure fields and values that meet the constraints indicated by the code structure query.

In one example, a user can generate and send the code structure query "type:class AND extends:ExtendedClass AND methodname:Method OR type:method AND methodname:Method NOT bar." This query can return code structure query results for classes that extend the class ExtendedClass and that include a method named "Method," or methods named Method that do not include the text "bar" in the code element. In this example, the Boolean operators "AND," "OR," and "NOT" operate on the field-value expressions and free text terms to indicate how the query terms are to be compared to structure values for conformance.

Code structure query results can be provided for the identified index records that are found to conform to the code structure query. For example, a structure query result stored in the identified index record can be provided as the code structure query results associated with the identified index record. The stored code structure query results can be stored as a structure value or as some other manner in the index record.

EXAMPLE 23

Exemplary Code Attributes

In any of the examples herein, a code attribute can be an attribute of a code element that can be determined from the source code structure of the code element. For example, determining the attribute can be done by parsing the text of the code element according to a programming language. For example, a method can have the attribute of calling another method. This can be determined from the text of the code element because the first method can have code text that calls the second method or indicates that it can call the second method. In another example, a code element can be identified as having the attribute of being a code element type of a class. In a further example, a code element can be identified as having the attribute of being written in a particular programming language. A programming language can allow source code to be written according to a particular syntax, and code attributes can be based on each syntax with its associated functionality.

A code attribute can be associated with some functionality or identifier of the source code or code element. For example, one code attribute can be that the code element implements some functionality. Another example code attribute can be that the code element calls another code element (e.g., a class, method, function). Another code attribute can be that the code element is a class or method identified by a class or method name. Other examples of code attributes can be that a code element has functionality that creates, extends, or imports a specific code element or function. Other code attributes can be determined by a parser depending on the source code and the programming language it is written in.

EXAMPLE 24

Exemplary Source Code

In any of the examples herein, source code can be any software source code or portion of source code written according to an object-oriented programming language or a non-object-oriented programming language. For example, source code can be written in C, C++, C#, Java, Basic, Fortran, Lisp, Prolog, Perl, scripting languages, and the like.

In some examples, source code can be represented by a model, an intermediate representation of the source code, or the like. A representation of the source code can be used in place of the source code in any of the examples herein.

EXAMPLE 25

Exemplary Formatted Source Code

In any of the examples herein, formatted source code can be source code formatted for display in a user interface. For example formatted source code can include formatted source code files, HTML files that display source code when rendered in a web browser that can include HTML source-code files, or other files that can be used to display source code in a user interface. Formatted source code can include source code for a code element. The formatted source code can include comments that are part of the source code that is indexed.

Formatted source code can include text that references source code such as other code elements, or other segments of source code. The formatted source code can have links, with linking functionality, to the referenced source code for retrieval. A reference to source code can be the use of or text identifying a code element or functional unit of code in a source code element. For example the text for a function call in a code element can be a link (e.g., hyperlink) to retrieve the source code for the referenced function that is called in the code element. When the source code (e.g., formatted source code) for the called function is retrieved it can be displayed in a user interface.

In one implementation, the linking functionality can link internally to a code element. For example, if a first portion of a code element's source code references a second portion of the code elements source code, then the first portion of source code can link to the second portion of source code. When the link is used or selected the second portion of source code can be displayed. In one implementation, anchors can be used to jump to and display a specified portion of source code in a HTML file. Similarly, if a link from one code element references a portion of another code element then the referenced portion can be displayed when the link is used.

EXAMPLE 26

Exemplary Determining Code Hierarchy

In any of the examples herein code hierarchy information can be determined from index records. For example, when a code element is indexed information about the code's hierarchy can be input into the index record for the code element. An indexer can use the source code of code elements to input code information into index records. Code Hierarchy information can include dependency information such as information about parent and child code element relationships, calling relationships between code elements, type information, and other like relationships among code elements that can be determined from the source code of code elements.

In one implementation, code hierarchy information can include type hierarchy information that can indicate a relationship based on code element type. For example, for a particular class that extends another class and implements a particular interface, the type hierarchy can list the extended class and the particular interface as being associated with the class.

In another implementation, code hierarchy information can include call hierarchy information that can indicate a calling relationship. For example, for a particular code element that calls various functions, the call hierarchy information can list the called functions as being called by the code element. Also for example, for a code element that is called by various other code elements, the call hierarchy information can list the various calling functions as calling the code element.

EXAMPLE 27

Exemplary Computing Device

The techniques and solutions described herein can be performed by software and/or hardware of a computing environment, such as a computing device or computer system. For example, computing devices can include server computers, desktop computers, laptop computers, notebook computers, netbooks, tablet devices, mobile devices, or other types of computing devices (e.g., devices such as televisions, media players, or other types of entertainment devices that comprise computing capabilities such as audio/video streaming capabilities and/or network access capabilities). The techniques and solutions described herein can be performed in a cloud computing environment (e.g., comprising virtual machines and underlying infrastructure resources).

Figure 13:
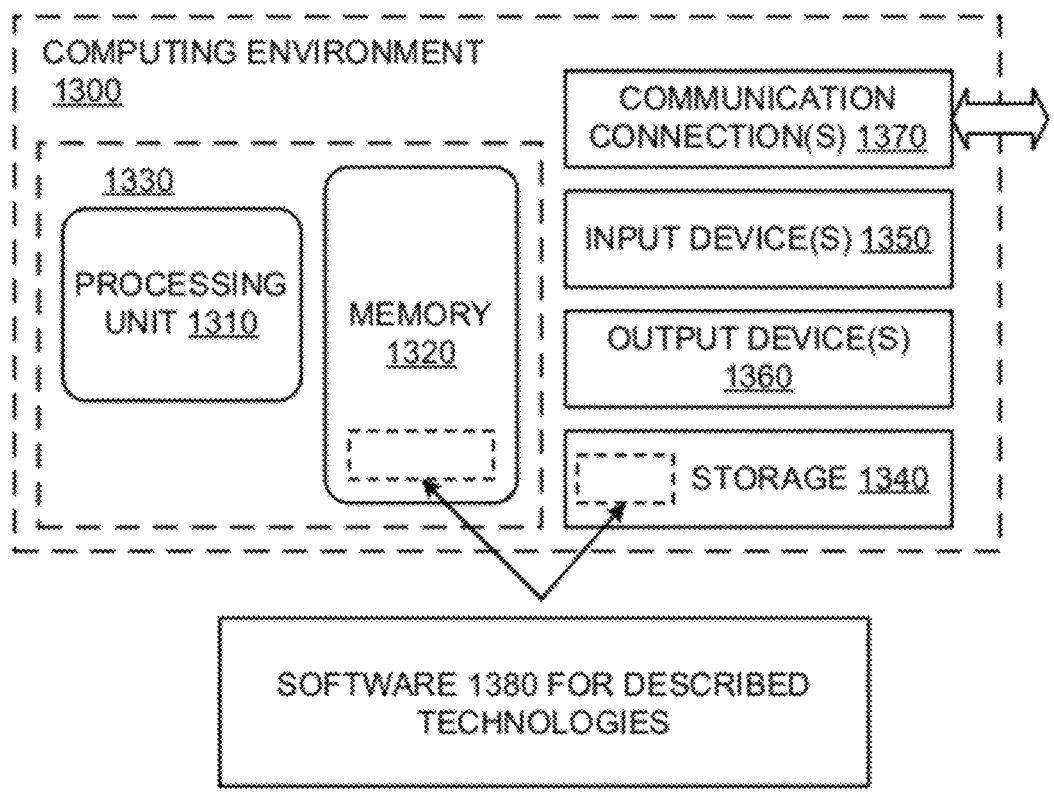
FIG. 13 illustrates a generalized example of a suitable computing environment in which described embodiments, techniques, and technologies may be implemented.

FIG. 13 illustrates a generalized example of a suitable computing environment 1300 in which described embodiments, techniques, and technologies may be implemented. The computing environment 1300 is not intended to suggest any limitation as to scope of use or functionality of the technology, as the technology may be implemented in diverse general-purpose or special-purpose computing environments. For example, the disclosed technology may be implemented using a computing device (e.g., a server, desktop, laptop, hand-held device, mobile device, PDA, etc.) comprising a processing unit, memory, and storage storing computer-executable instructions implementing the technologies described herein. The disclosed technology may also be implemented with other computer system configurations, including hand held devices, multiprocessor systems, microprocessor-based or programmable consumer electronics, network PCs, minicomputers, mainframe computers, a collection of client/server systems, or the like. The disclosed technology may also be practiced in distributed computing environments where tasks are performed by remote processing devices that are linked through a communications network. In a distributed computing environment, program modules may be located in both local and remote memory storage devices.

With reference to FIG. 13, the computing environment 1300 includes at least one central processing unit 1310 and memory 1320. In FIG. 13, this most basic configuration 1330 is included within a dashed line. The central processing unit 1310 executes computer-executable instructions. In a multi-processing system, multiple processing units execute computer-executable instructions to increase processing power and as such, multiple processors can be running simultaneously. The memory 1320 may be volatile memory (e.g., registers, cache, RAM), non-volatile memory (e.g., ROM, EEPROM, flash memory, etc.), or some combination of the two. The memory 1320 stores software 1380 that can, for example, implement the technologies described herein. A computing environment may have additional features. For example, the computing environment 1300 includes storage 1340, one or more input devices 1350, one or more output devices 1360, and one or more communication connections 1370. An interconnection mechanism (not shown) such as a bus, a controller, or a network, interconnects the components of the computing environment 1300. Typically, operating system software (not shown) provides an operating environment for other software executing in the computing environment 1300, and coordinates activities of the components of the computing environment 1300.

The storage 1340 may be removable or non-removable, and includes magnetic disks, magnetic tapes or cassettes, CD-ROMs, CD-RWs, DVDs, or any other tangible storage medium which can be used to store information and which can be accessed within the computing environment 1300. The storage 1340 stores computer-executable instructions for the software 1380, which can implement technologies described herein.

The input device(s) 1350 may be a touch input device, such as a keyboard, keypad, mouse, pen, or trackball, a voice input device, a scanning device, or another device, that provides input to the computing environment 1300. For audio, the input device(s) 1350 may be a sound card or similar device that accepts audio input in analog or digital form, or a CD-ROM reader that provides audio samples to the computing environment 1300. The output device(s) 1360 may be a display, printer, speaker, CD-writer, or another device that provides output from the computing environment 1300.

The communication connection(s) 1370 enable communication over a communication medium (e.g., a connecting network) to another computing entity. The communication medium conveys information such as computer-executable instructions, compressed graphics information, or other data in a modulated data signal.

EXAMPLE 28

Exemplary Alternatives and Variations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable media (tangible computer-readable storage media, such as one or more optical media discs, volatile memory components (such as DRAM or SRAM), or nonvolatile memory components (such as hard drives)) and executed on a computing device (e.g., any commercially available computer, including smart phones or other mobile devices that include computing hardware). By way of example, computer-readable media include memory 1320 and/or storage 1340. As should be readily understood, the term computer-readable media does not include communication connections (e.g., 1370) such as modulated data signals.

Any of the computer-executable instructions for implementing the disclosed techniques as well as any data created and used during implementation of the disclosed embodiments can be stored on one or more computer-readable media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to a particular type of hardware. Certain details of suitable computers and hardware are well known and need not be set forth in detail in this disclosure.

Furthermore, any of the software-based embodiments (comprising, for example, computer-executable instructions for causing a computing device to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

In view of the many possible embodiments to which the principles of the disclosed invention may be applied, it should be recognized that the illustrated embodiments are only preferred examples of the invention and should not be taken as limiting the scope of the invention. The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved. Rather, the scope of the invention is defined by the following claims. We therefore claim as our invention all that comes within the scope of these claims.

We claim:

1. A method implemented at least in part with a computing system, the method comprising:
    indexing source code, the indexing comprising creating index records for a plurality of code elements, wherein the index records for the plurality of code elements comprise structure fields and structure values that correspond to the structure fields;
    parsing the source code to identify a class or method in the source code;
    receiving a code structure query comprising at least one field-value expression, wherein the at least one field-value expression comprises a field term and a value term;
    identifying one or more of the index records that conform to the code structure query, wherein identifying one or more of the index records comprises identifying structure fields and structure values that correspond to the at least one field-value expression, wherein the field term corresponds to field identifiers of the structure fields and the value term corresponds to the structure values;
    based on the identified one or more of the index records that conform to the code structure query, receiving a code hierarchy, wherein the code hierarchy comprises a list of dependencies identified from an index record for the identified one or more of the index records that conform to the code structure query; and
    sending code structure query results that correspond to the identified one or more of the index records that conform to the code structure query;
    wherein the code structure query results comprise a first source code element represented by formatted source code comprising HTML that displays the first source code element when rendered in a web browser; and
    the formatted source code representing the first source code element comprises at least one hyperlink to an other source code element, wherein the other source code element corresponds to the class that is referenced in or the method that is called by the first source code element, wherein the hyperlink corresponds to a use of the other source code element in the first source code element, and activation of the hyperlink corresponding to the use of the other source code element in the first source code element results in retrieval of formatted source code for the other source code element that is used in the first source code element, wherein the formatted source code for the other source code element comprises HTML that displays the other source code element when rendered in a web browser.

2. The method of claim 1, wherein the indexing further comprises parsing the source code according to syntax of a programming language to extract information from code elements.

3. The method of claim 1 further comprising:
    receiving one or more selections of the code structure query results;
    wherein the indexing source code further comprises generating formatted source code; and
    sending formatted source code corresponding to the one or more selections of the code structure query results.

4. The method of claim 3 wherein the code structure query and the one or more selections of the code structure query results are received from a client device searching for source code; and
    wherein the code structure query results and formatted source code are sent to the client device for display in a user interface.

5. The method of claim 3, wherein the formatted source code comprises an HTML source-code file that displays source code of the first code element corresponding to the one or more selections of the code structure query results, wherein the HTML source-code file includes links to referenced source code.

6. The method of claim 3 further comprising:
based on the one or more selections from the code structure query results, sending a code hierarchy to a client device for display.

7. The method of claim 1 wherein the structure fields and the structure values are based on structural attributes of the code elements.

8. The method of claim 1 wherein the code structure query further comprises one or more Boolean operators that operate on the at least one field-value expression.

9. The method of claim 8 wherein the code structure query further comprises free text terms; and
wherein the one or more Boolean operators further operate on the free text terms.

10. The method of claim 1, wherein a code structure query result of the code structure query results is stored as a structure value of the index record of the first code element.

11. The method of claim 1 further comprising:
generating at least one annotation record associated with at least one code element of the plurality of code elements, the at least one annotation record comprising comments about the at least one code element that are not found in the indexed source code.

12. A computing system comprising memory storing computer executable instructions that cause the computing system to perform a method, the method comprising:
indexing source code, the indexing comprising parsing source code according to syntax of a programming language and creating index records for a plurality of code elements, wherein the index records for the plurality of code elements comprise structure fields and structure values that correspond to the structure fields;
sending, to a server, a code structure query comprising at least one field-value expression, wherein the at least one field-value expression comprises a field term and a value term;
receiving, from the server, a list of code structure query results that correspond to one or more of the index records that conform to the code structure query, wherein the one or more of the index records comprise structure fields and structure values that correspond to the at least one field-value expression, wherein the field term corresponds to field identifiers of the structure fields and the value term corresponds to the structure values;
selecting of one of the code structure query results from the list of code structure query results;
based on the selection of one of the code structure query results, receiving a code hierarchy from the server, wherein the code hierarchy comprises a list of dependencies identified from the index record for the selected one of the code structure query results;
based on the selection of one of the code structure query results, receiving, from the server, a selected HTML source-code file comprising a plurality of links to different HTML source-code files corresponding to code elements referenced in source code of the selected HTML source-code file, wherein the code elements referenced in the source code comprise a class that is referenced in the source code or a method that is called by the source code, wherein the different HTML source-code files comprise HTML that displays a source code element when rendered in a web browser;
sending a code annotation associated with the selected HTML source-code file, the code annotation comprising comments provided by a user about the source code in the selected HTML source-code file that are not found in the indexed source code; and
receiving, an annotation result corresponding to the selected HTML source-code file comprising the comments about the source code provided by the user that are not found in the indexed source code and a code structure query result corresponding to the selected HTML source-code file.

13. A computing system comprising memory storing computer executable instructions that cause the computing system to perform a method, the method comprising:
indexing source code, the indexing comprising creating index records for a plurality of code elements, wherein the index records for the plurality of code elements comprise structure fields and structure values that correspond to the structure fields;
parsing the source code to identify a class or method in the source code;
receiving a code structure query comprising at least one field-value expression, wherein the at least one field-value expression comprises a field term and a value term;
identifying one or more of the index records that conform to the code structure query, wherein the identified one or more of the index records comprise structure fields and structure values that correspond to the at least one field-value expression, wherein the field term corresponds to field identifiers of the structure fields and the value term corresponds to the structure values;
sending a list of code structure query results that correspond to the identified one or more of the index records that conform to the code structure query;
receiving one or more selections from the list of code structure query results;
based on the one or more selections from the list of code structure query results, receiving a code hierarchy, wherein the code hierarchy comprises a list of dependencies identified from an index record for the one or more selections from the list of code structure query results;
wherein indexing the source code further comprises generating formatted source code, wherein the formatted source code comprises HTML that displays a first code element of the source code when rendered in a web browser, wherein the formatted source code comprises at least one hyperlink corresponding to a second code element referenced in the source code of the first code element, wherein the second code element corresponds to the class that is referenced in or the method that is called by the first code element, wherein the hyperlink corresponds to a use of the second code element in the first code element; and
sending formatted source code corresponding to the one or more selections from the list of code structure query results.

14. The computing system of claim 13, wherein the code structure query and the one or more selections from the list of code structure query results are received from a user searching for source code; and
wherein the list of code structure query results and formatted source code are sent to a client device for display.

15. The computing system of claim 13, wherein the structure fields and the structure values are based on structural attributes of the code elements.

16. The computing system of claim 13, wherein the code structure query further comprises one or more Boolean operators that operate on the at least one field-value expression.

17. The computing system of claim 16, wherein the code structure query further comprises free text terms; and
wherein the one or more Boolean operators further operate on the free text terms.

18. The computing system of claim 13 further comprising:
based on the one or more selections from the list of code structure query results, sending a code hierarchy to a client device for display.

19. The computing system of claim 13 further comprising:
generating at least one annotation record associated with at least one code element of the plurality of code elements, the at least one annotation record comprising comments about the at least one code element that are not found in the indexed source-code;
sending at least one annotation result comprising the comments about the at least one code element that are not found in the indexed source code and a code structure query result corresponding to the at least one code element.

20. A method implemented at least in part with a computing system, the method comprising:
sending, to a server, a code structure query comprising at least one field-value expression, wherein the at least one field-value expression comprises a field term and a value term;
receiving, from the server, a list of code structure query results that correspond to one or more index records that conform to the code structure query, the one or more index records comprise structure fields and structure values that correspond to the at least one field-value expression, wherein the field term corresponds to field identifiers of the structure fields and the value term corresponds to the structure values;
selecting at least one of the code structure query results from the list of code structure query results;
based on the selected at least one of the code structure query results, receiving, from the server, a selected formatted source-code file comprising a plurality of links to different formatted source-code files corresponding to code elements referenced in source code of the selected formatted source-code file, wherein the code elements referenced in the source code comprise classes that are referenced in or methods that are called by the source code, wherein the links appear in the source code of the selected formatted source-code file and activation of at least one of the links results in retrieval of the formatted source-code file corresponding to the at least one of the links, wherein the different formatted source-code files comprise HTML that displays a source code element when rendered in a web browser;
sending a code annotation associated with the selected formatted source-code file, the code annotation comprising comments provided by a user about the source code in the selected formatted source-code file that are not found in the selected formatted source-code file; and
receiving, an annotation result corresponding to the selected formatted source-code file comprising the comments about the source code provided by the user that are not found in the selected formatted source-code file and a code structure query result for the selected formatted source-code file;
wherein the method further comprises:
indexing source code at least by parsing the source code according to syntax of a programming language to create the one or more index records for one or more code elements, wherein the index records for the one or more code elements comprise structure fields and structure values that correspond to the structure fields; and
based on the selected at least one of the code structure query results, receiving a code hierarchy from the server, wherein the code hierarchy comprises a list of dependencies identified from an index record for the selected one of the code structure query results.

21. A non-transitory computer readable storage medium storing computer-executable instructions that cause a computer to perform a method, the method comprising:
indexing a plurality of source-code files, the indexing the plurality of source code files comprising:
creating HTML source-code files from the plurality of source-code files, wherein the creating comprises parsing the source-code files to identify a class or method in the source-code files;
creating index documents for the plurality of source-code files by parsing source code according to syntax of a programming language, wherein the index documents for the plurality of source-code files comprise structure fields and structure values that correspond to the structure fields;
receiving, from a client device, a code structure query comprising a plurality of field-value expressions, wherein a field-value expression of the plurality of field-value expressions comprises a field term and a value term separated by a colon;
identifying one or more of the index documents that conform to the code structure query, wherein identifying one or more of the index documents comprises identifying structure fields and structure values that correspond to the plurality of field-value expressions, wherein the field term to the left of the colon of the field-value expression corresponds with field identifiers of the structure fields and the value term to the right of the colon of the field-value expression corresponds with the structure values;
sending, to the client device, a list of code structure query results that correspond to the identified one or more of the index documents that conform to the code structure query;
receiving, from the client device, a selection of one of the code structure query results from the list of code structure query results;
based on the selection of one of the code structure query results, sending a code hierarchy to the client device, wherein the code hierarchy comprises a list of dependencies identified from the index document for the selected one of the code structure query results;
sending, to the client device, a selected HTML source-code file corresponding to the selected one of the code structure query results, the selected HTML source-code file comprising a plurality of links to different HTML source-code files corresponding to code elements referenced in source code of the selected HTML source-code file, wherein the code elements referenced in the source code comprise the class that is referenced in or the method that is called by source code, wherein the links comprise a use of at least one of the code elements referenced in the source code, and the links comprise a link appearing at a location within the source code of the selected HTML source-code file corresponding to the use of the class or method, and activation of at least one of the links results in retrieval of the HTML source-code file corresponding to the at least one of the links, wherein the different HTML source-code files comprise HTML that displays a source code element when rendered in a web browser;

creating an annotation record associated with the selected HTML source-code file, the annotation record comprising comments provided by a user about the source code in the selected HTML source-code file that are not found in the indexed source-code files; and sending, to the client device, an annotation result comprising the comments about the source code provided by the user that are not found in the indexed source-code files and code structure query results corresponding to the selected HTML source-code file.

* * * * *